(12) United States Patent
Nagai et al.

(10) Patent No.: US 8,171,241 B2
(45) Date of Patent: May 1, 2012

(54) COMPUTER SYSTEM, COMPUTER AND METHOD FOR MANAGING PERFORMANCE BASED ON I/O DIVISION RATIO

(75) Inventors: Takayuki Nagai, Machida (JP); Jun Nakajima, Kawasaki (JP); Yuichi Yagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 536 days.

(21) Appl. No.: 11/613,412

(22) Filed: Dec. 20, 2006

(65) Prior Publication Data

US 2008/0104356 A1   May 1, 2008

(30) Foreign Application Priority Data

Oct. 25, 2006   (JP) .................................. 2006-289971

(51) Int. Cl.
G06F 12/00 (2006.01)
G06F 13/00 (2006.01)
G06F 13/28 (2006.01)

(52) U.S. Cl. .......................... 711/156; 711/114; 709/226

(58) Field of Classification Search .................. 711/114, 711/156
See application file for complete search history.

(56) References Cited

U.S. PATENT DOCUMENTS

| | | | |
|---|---|---|---|
| 6,044,367 A * | 3/2000 | Wolff ................................ | 707/2 |
| 6,185,601 B1 * | 2/2001 | Wolff .............................. | 709/203 |
| 6,732,104 B1 | 5/2004 | Weber | |
| 6,886,035 B2 * | 4/2005 | Wolff .............................. | 709/219 |
| 2002/0184463 A1 | 12/2002 | Arakawa et al. | |
| 2003/0033494 A1 | 2/2003 | Fujibayashi et al. | |
| 2003/0126200 A1 * | 7/2003 | Wolff .............................. | 709/203 |
| 2003/0204597 A1 * | 10/2003 | Arakawa et al. .............. | 709/226 |
| 2004/0043755 A1 | 3/2004 | Shimooka et al. | |
| 2004/0078632 A1 | 4/2004 | Infante et al. | |
| 2004/0133707 A1 | 7/2004 | Yoshiya et al. | |
| 2004/0143832 A1 | 7/2004 | Yamamoto et al. | |
| 2004/0193827 A1 | 9/2004 | Mogi et al. | |
| 2004/0225662 A1 | 11/2004 | Nojima | |

(Continued)

FOREIGN PATENT DOCUMENTS

JP   2004-086512   3/2004

(Continued)

OTHER PUBLICATIONS

Notification of Reasons for Refusal for Japanese Patent Application No. 2006-289971, mailed Jan. 6, 2009 (with English translation).

(Continued)

*Primary Examiner* — Brian Peugh
*Assistant Examiner* — Prasith Thammavong
(74) *Attorney, Agent, or Firm* — Brundidge & Stanger, P.C.

(57) ABSTRACT

Provided is a computer system including a host computer, a plurality of virtual storage systems coupled to the host computer, a storage system coupled to the plurality of virtual storage systems, and a management computer. The storage system includes storage areas provided as volumes to the host computer. Each of the virtual storage systems provides virtual volumes corresponding to the volumes to the host computer. The host computer disperses a plurality of data I/Os containing data to be written in one of the volumes to the virtual volumes of a plurality of paths reaching the one of the volumes at a determined ratio. The management computer calculates a threshold value of a performance value to be set in the virtual volume of each of the paths to determine whether to generate an alert based on the predetermined ratio. Thus, performance of the computer system is properly managed.

11 Claims, 16 Drawing Sheets

STORAGE SYSTEM PERFORMANCE LIST
33300

| SYSTEM ID 33310 | DEVICE ID 33320 | I/O AMOUNT PER UNIT TIME 33330 | THRESHOLD VALUE OF ALERT 33340 |
|---|---|---|---|
| SYS1 | VOL111 | 200 | 1000 |
| SYS1 | VOL112 | 40 | 200 |
| SYS2 | VOL121 | 20 | 100 |
| SYS2 | VOL122 | 240 | 800 |
| SYS3 | VOL131 | 30 | 100 |
| SYS3 | VOL132 | 30 | 100 |
| HOST1 | DEV111 | 140 | - |
| HOST1 | DEV112 | 40 | - |
| HOST1 | DEV121 | 20 | - |
| HOST1 | DEV122 | 240 | - |
| HOST1 | DEV131 | 30 | - |
| HOST1 | DEV132 | 30 | - |
| SYS1 | PORT1 | 300 | 1000 |
| SYS2 | PORT2 | 400 | 1000 |
| SYS3 | PORT3 | 360 | 1000 |
| : | : | : | : |

U.S. PATENT DOCUMENTS

| | | | |
|---|---|---|---|
| 2004/0257857 A1 | 12/2004 | Yamamoto et al. | |
| 2005/0193167 A1 | 9/2005 | Eguchi et al. | |
| 2005/0216692 A1 | 9/2005 | Watanabe et al. | |
| 2005/0259632 A1* | 11/2005 | Malpani et al. | 370/351 |
| 2006/0220533 A1 | 10/2006 | Achiwa et al. | |
| 2006/0253549 A1* | 11/2006 | Arakawa et al. | 709/217 |
| 2006/0271758 A1 | 11/2006 | Innan et al. | |
| 2007/0055840 A1 | 3/2007 | Yamamoto et al. | |
| 2007/0094357 A1* | 4/2007 | Sugitani et al. | 709/219 |

FOREIGN PATENT DOCUMENTS

| | | |
|---|---|---|
| JP | 2004-206623 | 7/2004 |
| JP | 2004-220450 | 8/2004 |
| JP | 2004-302751 | 10/2004 |
| JP | 2004-334561 | 11/2004 |
| JP | 2005-011277 | 1/2005 |
| JP | 2005-242690 | 9/2005 |
| JP | 2005-275525 | 10/2005 |

OTHER PUBLICATIONS

U.S. Appl. No. 11/254,798, filed Oct. 2005, Yamamoto et al.
European Search Report in European Application No. 07251206.4-1245/1916595 dated Jun. 7, 2010.

* cited by examiner

ALTERNATIVE PATH LIST

14400

| VIRTUAL DEVICE ID (14410) | DEVICE FILE ID (14420) | CONNECTED STORAGE SYSTEM ID (14430) | CONNECTED PORT ID (14440) | CONNECTED VOLUME ID (14450) | I/O DIVISION RATIO (14460) |
|---|---|---|---|---|---|
| DEV1 | DEV111 | SYS1 | PORT1 | VOL111 | 70% |
|  | DEV121 | SYS2 | PORT2 | VOL121 | 20% |
|  | DEV131 | SYS3 | PORT3 | VOL131 | 10% |
| DEV2 | DEV112 | SYS1 | PORT1 | VOL112 | 80% |
|  | DEV122 | SYS2 | PORT2 | VOL122 | 10% |
|  | DEV132 | SYS3 | PORT3 | VOL132 | 10% |
| : | : | : | : | : | : |

FIG. 7

VIRTUAL VOLUME LIST

23200

| VIRTUAL VOLUME ID (23210) | PORT ID (23220) | CONNECTED STORAGE SYSTEM ID (23230) | CONNECTED PORT ID (23240) | CONNECTED VOLUME ID (23250) |
|---|---|---|---|---|
| VOL111 | PORT21 | SYS4 | PORT24 | VOL1 |
| VOL112 | PORT21 | SYS4 | PORT24 | VOL2 |
| : | : | : | : | : |

FIG. 8

STORAGE SYSTEM PERFORMANCE LIST

| SYSTEM ID | DEVICE ID | I/O AMOUNT PER UNIT TIME | THRESHOLD VALUE OF ALERT |
|---|---|---|---|
| SYS1 | VOL111 | 200 | 1000 |
| SYS1 | VOL112 | 40 | 200 |
| SYS2 | VOL121 | 20 | 100 |
| SYS2 | VOL122 | 240 | 800 |
| SYS3 | VOL131 | 30 | 100 |
| SYS3 | VOL132 | 30 | 100 |
| HOST1 | DEV111 | 140 | - |
| HOST1 | DEV112 | 40 | - |
| HOST1 | DEV121 | 20 | - |
| HOST1 | DEV122 | 240 | - |
| HOST1 | DEV131 | 30 | - |
| HOST1 | DEV132 | 30 | - |
| SYS1 | PORT1 | 300 | 1000 |
| SYS2 | PORT2 | 400 | 1000 |
| SYS3 | PORT3 | 360 | 1000 |
| : | : | : | : |

*FIG. 9*

STORAGE CLUSTER CONFIGURATION LIST

| VIRTUAL DEVICE ID | DEVICE FILE ID | VIRTUAL STORAGE SYSTEM ID | VIRTUAL VOLUME ID | CONNECTION SOURCE STORAGE SYSTEM ID | VOLUME ID | MASTER/ SLAVE TYPE |
|---|---|---|---|---|---|---|
| DEV1 | DEV111 | SYS1 | VOL111 | SYS4 | VOL1 | Master |
|  | DEV121 | SYS2, SYS1 | VOL121, VOL111 |  |  | Slave |
|  | DEV131 | SYS3, SYS1 | VOL131, VOL111 |  |  | Slave |
| DEV2 | DEV112 | SYS1 | VOL112 | SYS4 | VOL2 | Master |
|  | DEV122 | SYS2, SYS1 | VOL122, VOL112 |  |  | Slave |
|  | DEV132 | SYS3, SYS1 | VOL132, VOL112 |  |  | Slave |
| : | : | : | : | : | : | : |

*FIG. 11*

DEVICE GROUP LIST

| GROUP ID | GROUP COMPONENT |
|---|---|
| G1 | DEV111(Master), DEV121, DEV131 |
| G2 | PORT1(Master), PORT2, PORT3 |
| G3 | VOL111(Master), VOL121, VOL131 |
| G4 | PORT12, PORT13 |
| : | : |

*FIG. 12*

I/O DIVISION RATIO LIST

| NUMBER OF VIRTUAL STORAGE SYSTEMS | MASTER STORAGE SYSTEM I/O DIVISION RATIO | SLAVE STORAGE SYSTEM I/O DIVISION RATIO |
|---|---|---|
| 2 | 90% | 10% |
| 3 | 80% | 10% |
| 4 | 70% | 10% |
| ⋮ | ⋮ | ⋮ |

COMPUTER SYSTEM, COMPUTER AND METHOD FOR MANAGING PERFORMANCE BASED ON I/O DIVISION RATIO

CLAIM OF PRIORITY

The present application claims priority from Japanese application JP2006-289971 filed on Oct. 25, 2006, the content of which is hereby incorporated by reference into this application.

BACKGROUND

This invention relates to a software program for managing a host computer and a storage system used in a computer system, and more particularly, to a method of managing performance of a host computer and a storage system by using a management program.

A computer system generally includes a host computer for executing applications, and a storage system for reading/writing data according to instructions from the host computer. The storage system includes a plurality of magnetic disks for storing and reading data. The storage system provides a storage area in a form of a volume to the host computer. Also, there is generally a management program for managing configurations and performance of the host computer and the storage system. The management program periodically obtains configuration information and performance information from the host computer and the storage system to hold them in the program. The management program displays the configuration information and the performance information according to a command from an administrator who manages the computer system.

On the other hand, as described in JP 2005-11277 A, for example, the storage system can accept reading/writing of data from other storage system instead of accepting reading/writing of data from the host computer. For example, the host computer executes reading/writing of data in a virtual volume X provided by a storage system A. Upon reception of the reading/writing instruction in the volume X, the storage system A executes reading/writing of data in a volume Y of a storage system B. As a result, the host computer actually executes reading/writing in the volume Y while execution of reading/writing in the virtual volume X is being recognized. The function as described above is called a "storage system virtualization function", a virtual volume such as the volume X is called a "virtual volume", and a volume which is not virtual such as the volume Y is called a "real volume".

SUMMARY

In the computer system equipped with the storage system virtualization function, in a case where one storage system has many virtual volumes, when a data reading/writing amount in the virtual volumes suddenly increases, there is a fear that a data processing load may increase to reduce response performance to the host computer. When the storage system having the virtual volumes shuts down, there is a problem that the host computer will not be able to execute reading/writing at all in a real volume.

In the computer system that uses the storage system virtualization function, when I/O processing efficiency of a specific virtual storage system is reduced by load concentration or a system fault, the I/O processing efficiency of the virtual storage system can be restored by readjusting a balance of storage system processing efficiency and I/O loads between the plurality of virtual storage systems. Here, the virtual storage system is a storage system which has a virtual volume. The storage system having the function as described above is called a "cluster type storage system". In the cluster type storage system, a load balance can automatically be adjusted between the storage systems without any intervention of the storage system administrator.

In the cluster type storage system, there are a plurality of virtual storage systems which include virtual volumes corresponding to one real volume. In other words, there are a plurality of data paths from the host computer through the virtual volumes to the one real volume. In this case, by installing an "alternative path management program" for allocating reading/writing of data in the virtual volumes to a plurality of paths in the host computer, the data reading/writing amount can be allocated to each path at a predetermined ratio in accordance with settings made by the administrator. At this time, the plurality of paths may include a main path through which data mainly flows at a normal time and a subpath through which only a small amount of data flows at the normal time and which becomes a new main path when I/O processing efficiency of the main path drops.

The management program periodically obtains the configuration information and the performance information from the storage system to be stored and the host computer to be stored, and stores the obtained information in a database which is managed by the management program. The stored configuration information and the performance information are displayed according to a request from the administrator. For example, the performance information indicates a data amount or the like received/transmitted per unit time and obtained for each component such as a volume or a port of the monitoring target storage system. The component of each path, such as the volume or the port, will be referred to as "device" hereinafter.

In a case of monitoring the performance by using the storage system management program, the administrator presets a threshold value for a monitoring target device. Then, for example, when the reading/writing amount from the host computer in a certain volume exceeds the threshold value, the management program can alert the administrator by notifying that the threshold value has exceeded.

However, there is a possibility that when the threshold value is set, the administrator may set the threshold value without considering a data division ratio of the virtual volumes by the alternative path management program. For example, when a large threshold value is set in the subpath of a small data flow rate, the threshold value may lose its significance. Accordingly, it is a first object of this invention to prevent inhibition of proper performance management due to setting of an improper threshold value.

Further, the cluster type storage system has a function replacing the main path with the subpath and vice versa by dynamically changing a device configuration of the storage system to obtain a load balance between the storage systems. However, the data division ratio of each path of the alternative path management program and the threshold value set in the management program are not changed without an operation by the administrator. Thus, unless there is an operation by the administrator, the computer system is continuously used in a state where the performance of each path and the flow rate are not balanced. This inhibits the proper performance management by the alternative path management program and the management program. It is a second object of this invention to prevent the inhibition of the proper performance management as described above.

Further, the cluster type storage system has a function of securing a data I/O path by dynamically changing the device configuration of the storage system to use the subpath as a new main path when certain faults occur in the devices of the main path and the subpath. However, even when a flow rate balance of each path is changed, the threshold value set in the management program is not changed without the operation by the administrator. Thus, the threshold value not matched with the flow rate balance of each path is continuously used until the operation is made by the administrator. This inhibits the proper performance management of the management program. It is a third object of this invention to prevent inhibition of the proper performance management of the management program due to a changed flow rate balance.

According to a representative embodiment of this invention, there is provided a computer system including: a host computer; a plurality of virtual storage systems connected to the host computer; a storage system coupled to the plurality of virtual storage systems; and a management computer coupled to the host computer, the virtual storage systems, and the storage system, in which: the storage system includes a first interface coupled to the virtual storage system via a first network, a second interface coupled to the management computer via a second network, a first processor coupled to the first interface and the second interface, and a first memory coupled to the first processor, and provides storage areas as volumes to the host computer; each of the virtual storage systems includes a third interface coupled to the host computer and the storage system via the first network, a fourth interface coupled to the management computer via the second network, a second processor coupled to the third interface and the fourth interface, and a second memory coupled to the second processor, and provides virtual volumes corresponding to the volumes to the host computer; the host computer includes a fifth interface coupled to the virtual storage systems via the first network, a sixth interface coupled to the management computer via the second network, a third processor coupled to the fifth interface and the sixth interface, and a third memory coupled to the third processor, and disperses a plurality of data I/Os containing data to be written in one of the volumes to the virtual volumes of a plurality of paths reaching the one of the volumes at a determined ratio; and the management computer includes a seventh interface coupled to the host computer, the virtual storage systems and the storage system via the second network, a fourth processor coupled to the seventh interface, and a fourth memory coupled to the fourth processor, and calculates, based on the determined ratio, a threshold value of a performance value to be set in the virtual volume of each of the paths to determine whether to generate an alert.

According to this embodiment of this invention, it is possible to properly manage the performance of the computer system by setting the proper threshold value in the device of the computer system.

BRIEF DESCRIPTION OF THE DRAWINGS

FIG. 7 is an explanatory diagram of an alternative path list held by the host computer according to the first embodiment of this invention.

FIG. 8 is an explanatory diagram of a virtual volume list held by the virtual storage system according to the first embodiment of this invention.

FIG. 9 is an explanatory diagram of a storage system performance list held by the management computer according to the first embodiment of this invention.

FIG. 11 is an explanatory diagram of a storage cluster configuration list held by the management computer according to the first embodiment of this invention.

FIG. 12 is an explanatory diagram of a device group list held by the management computer according to the first embodiment of this invention.

DETAILED DESCRIPTION OF THE PREFERRED EMBODIMENTS

Figure 1:
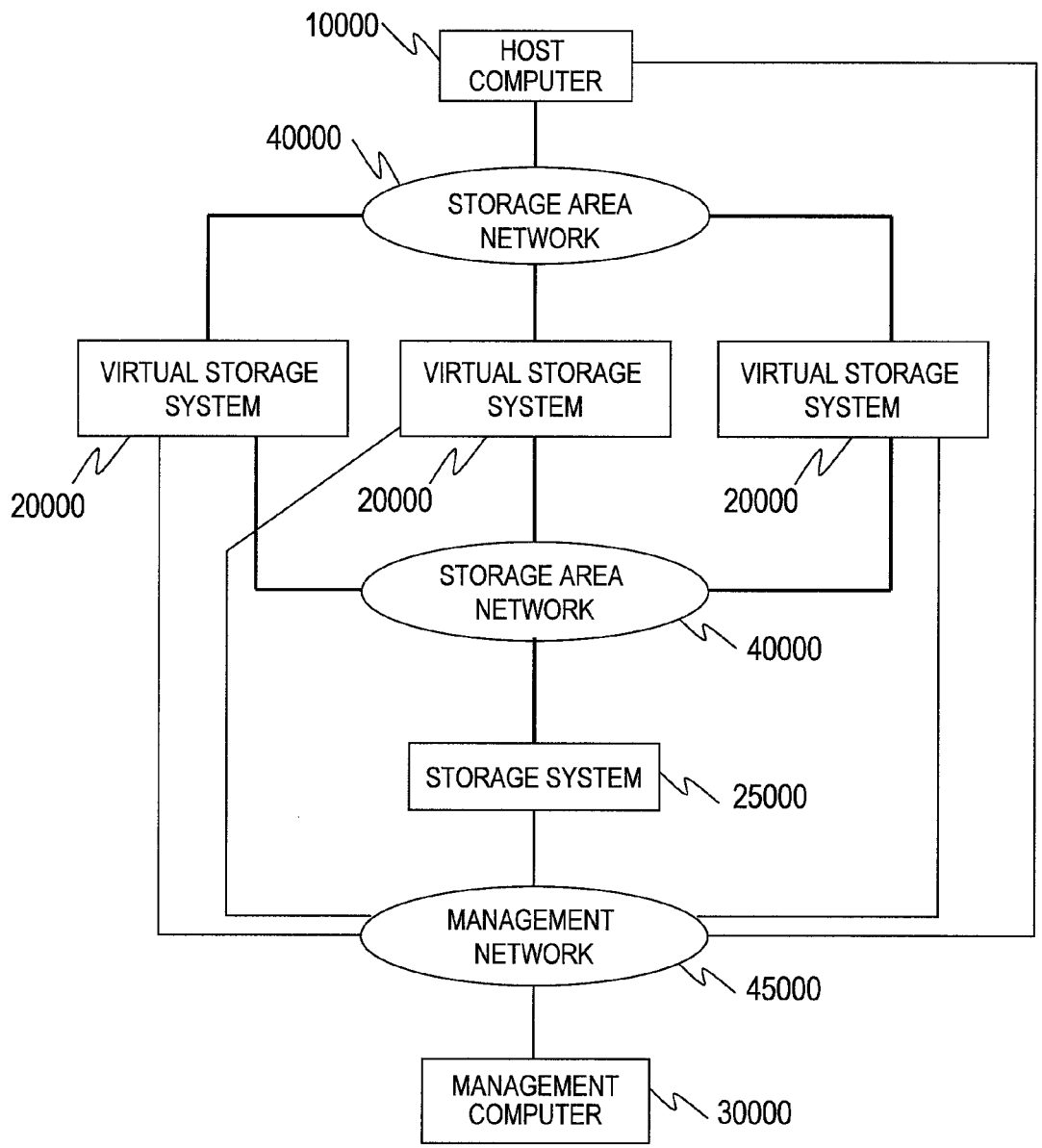
FIG. 1 is a block diagram showing a configuration of a computer system according to a first embodiment of this invention.

The preferred embodiments of this invention will be described below referring to the drawings.

First, a first embodiment of this invention will be described.

According to the first embodiment of this invention, a storage system management program obtains a data division ratio of each path from an alternative path management program of a host computer beforehand. When setting a threshold value for performance management in a management target device, a storage system administrator calculates and sets a threshold value of a device belonging to each path based on the data division ratio.

FIG. 1 is a block diagram showing a configuration of a computer system according to the first embodiment of this invention.

The computer system of the first embodiment includes a plurality of virtual storage systems 20000, a storage system 25000, a host computer 10000, and a management computer 30000. The plurality of virtual storage systems 20000, the storage system 25000, and the host computer 10000 are interconnected via a storage area network 40000. The plurality of virtual storage systems 20000, the storage system 25000, and the host computer 10000 are connected to the management computer 30000 via a management network 45000.

For example, the storage area network 40000 may be a network to which a fibre channel protocol is applied, or other types of network. The management network 45000 may be a so-called local area network (LAN), or other types of network. The storage area network 40000 and the management network 45000 may be the same network.

Figure 2:
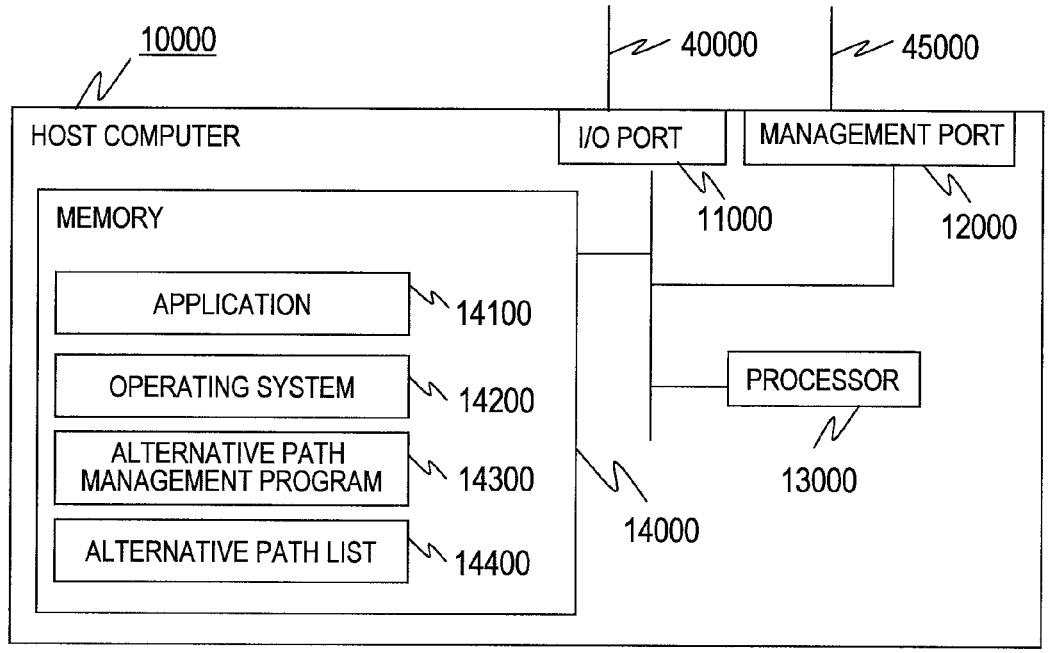
FIG. 2 is a block diagram showing a detailed configuration of a host computer according to the first embodiment of this invention.

FIG. 2 is a block diagram showing a detailed configuration of the host computer 10000 according to the first embodiment of this invention.

The host computer 10000 includes an I/O port 11000 which is an interface for connection to the storage area network 40000, a management port 12000 which is an interface for connection to the management network 45000, a processor 13000, and a memory 14000. Those components are interconnected via a circuit such as an internal bus. The memory 14000 stores an application program 14100, an operating system 14200, an alternative path management program 14300, and an alternative path list 14400.

The processor 13000 operates the application program 14100, the operating system 14200, and the alternative path management program 14300 in the memory 14000. The processor 13000 issues a data I/O to a volume of the storage system 25000 connected via the I/O port 11000 by the storage area network 40000 according to an operation state of the application program 14100.

It is the processor 13000 that actually issues the I/O to the volume of the storage system 25000. However, for convenience, it is described hereinafter that the I/O is issued mainly by the application program 14100, the operating system 14200, and the alternative path management program 14300 operated by the processor 13000.

The application program 14100 uses storage area provided from the operating system to input/output data (I/O hereinafter) to/from the storage area.

The operating system 14200 causes the application program 14100 to recognize a virtual device (described below) provided from the alternative path management program as the storage area. The operating system 14200 issues the I/O received from the application program 14100 to the virtual device 16000 via the alternative path management program 14300.

The alternative path management program 14300 recognizes a volume 29100 of the storage system 25000 connected to the host computer 10000 via the storage area network 40000 as a device file 15000, and causes the operating system 14200 to recognize one of a plurality of device files 15000 as one virtual device 16000. The volume 29100, the device file 15000, and the virtual device 16000 will be described below shown in FIGS. 4 and 6. The alternative path management program 14300 disperses and issues a plurality of I/O issued from the operating system 14200 to the virtual device 16000 to the plurality of device files 15000 shown in FIG. 7.

The alternative path list 14400 stores a ratio of dividing I/O of the virtual device 16000 to the device files 15000 by the alternative path management program 14300 shown in FIG. 7.

The processor 13000 executes programs such as the application program 14100, the operating system 14200, and the alternative path management program 14300 stored in the memory 14000. In the description below, processing executed by the programs in the memory 14000 will actually be executed by the processor 13000.

Figure 3:
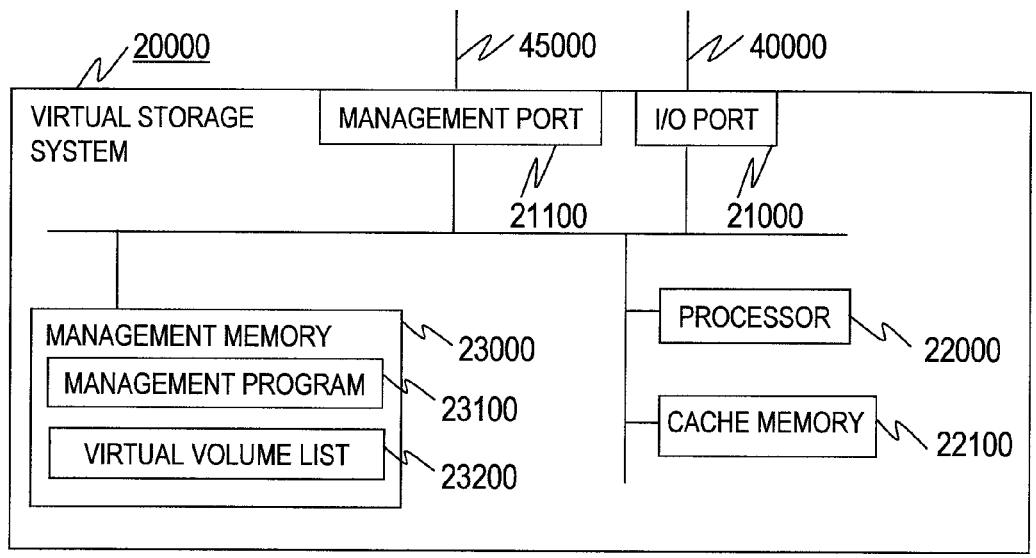
FIG. 3 is a block diagram showing a detailed configuration example of a virtual storage system according to the first embodiment of this invention.

FIG. 3 is a block diagram showing a detailed configuration example of the virtual storage system 20000 according to the first embodiment of this invention.

The virtual storage system 20000 includes an I/O port 21000 which is an interface for connection to the host computer 10000 or the storage system 25000 via the storage area network 40000, a management port 21100 which is an interface for connection to the management network 45000, a processor 22000 for controlling the virtual storage system 20000, a cache memory 22100 for temporarily storing data, and a management memory 23000 used by the processor. Those components are interconnected via a circuit such as an internal bus.

The management memory 23000 stores a management program 23100 for controlling the virtual storage system 20000 and a virtual volume list 23200.

The management program 23100 has a storage system virtualization function and a storage cluster function. The storage system virtualization function provides the volume 29100 of the storage system 25000 connected via the I/O port 21000 shown in FIG. 4 as a virtual volume 24000 shown in FIG. 6 to the host computer 10000. In other words, the virtual volume 24000 is a virtual storage area corresponding to the volume 29100. The storage cluster function will be described below.

The virtual volume list 23200 stores information indicating a correlation between the virtual volume 24000 and the volume 29100 of the storage system 25000.

The processor 22000 executes the management program 23100 stored in the management memory 23000. In the description below, processing executed by the management program 23100 will actually be executed by the processor 22000.

The cache memory 22100 temporarily stores at least one of data transferred between the virtual storage system 20000 and the host computer 10000 and data transferred between the virtual storage system 20000 and the storage system 25000.

FIG. 3 shows one I/O port 21000. However, the virtual storage system 20000 may include a plurality of I/O ports 21000.

Figure 4:
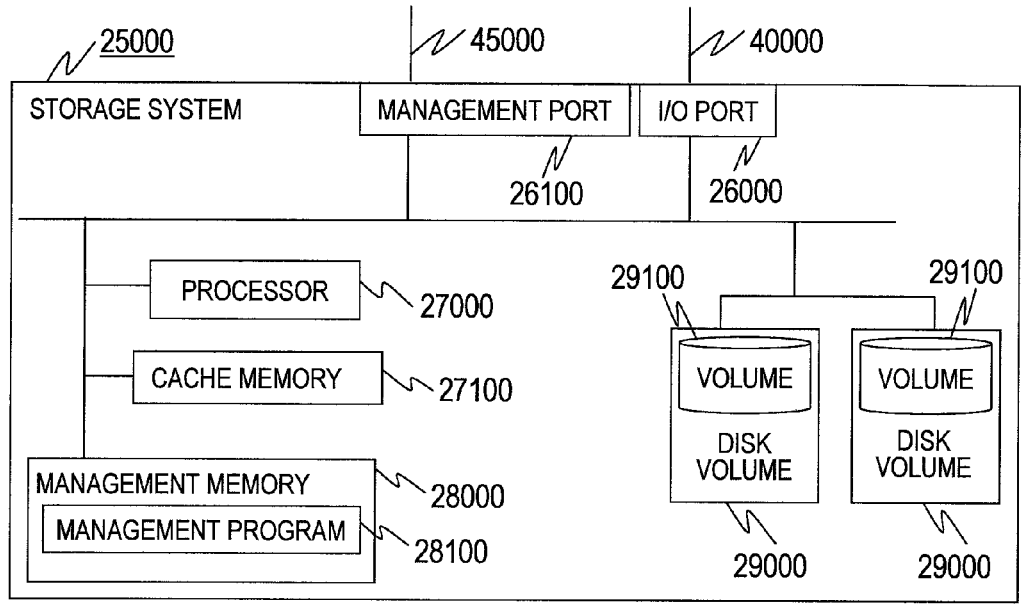
FIG. 4 is a block diagram showing a detailed configuration example of a storage system according to the first embodiment of this invention.

FIG. 4 is a block diagram showing a detailed configuration example of the storage system 25000 according to the first embodiment of this invention.

The storage system 25000 includes an I/O port 26000 which is an interface for connection to the virtual storage system 20000 via the storage area network 40000, a management port 26100 which is an interface for connection to the management network 45000, a processor 27000 for controlling the storage system 25000, a cache memory 27100 for temporarily storing data transferred with the virtual storage system 20000, a management memory 28000 used by the processor 27000, and one or more disk volumes 29000 for storing data provided to the host computer 10000. Those components are interconnected via a circuit such as an internal bus.

The management memory 28000 stores a management program 28100 for controlling the storage system 25000.

Each disk volume 29000 includes one or more magnetic disks. When the disk volume 29000 includes a plurality of magnetic disks, the magnetic disks may constitute redundant arrays of inexpensive disks (RAID). Each disk volume 29000 is logically divided into one or more volumes 29100.

The processor 27000 executes the management program 28100 stored in the management memory 28000. In the description below, processing executed by the management program 28100 will actually be executed by the processor 27000.

Figure 5:
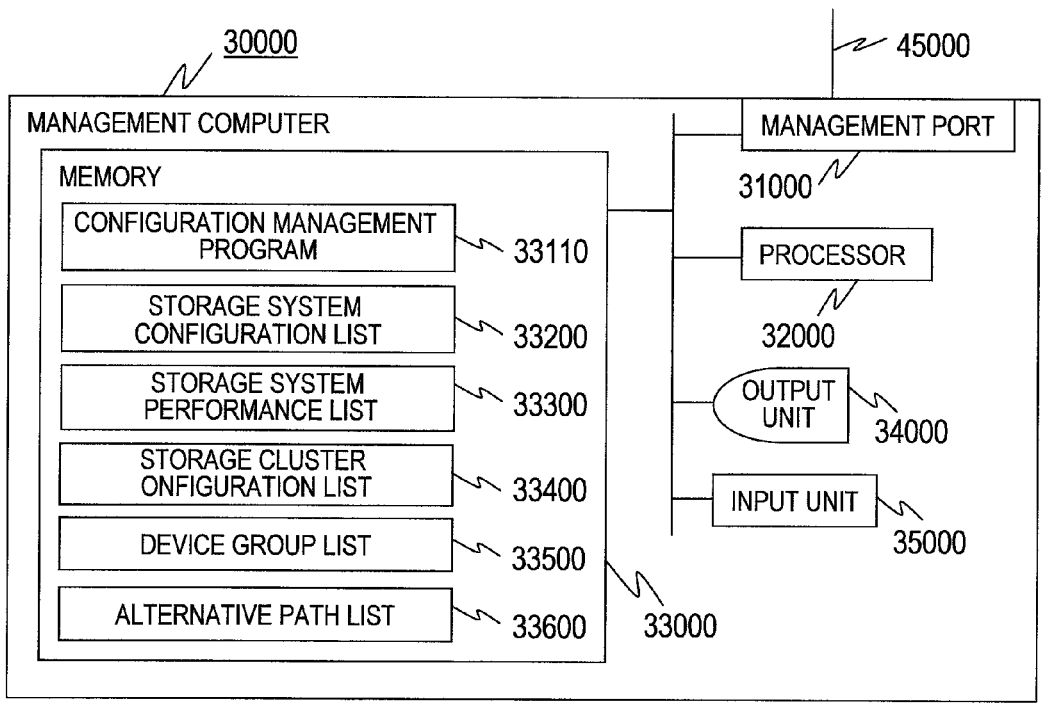
FIG. 5 is a block diagram showing a detailed configuration of a management computer according to the first embodiment of this invention.

FIG. 5 is a block diagram showing a detailed configuration of the management computer 30000 according to the first embodiment of this invention.

The management computer 30000 includes a management port 31000 which is an interface for connection to the management network 45000, a processor 32000, a memory 33000, an output unit 34000, and an input unit 35000. Those components are interconnected via a circuit such as an internal bus.

The memory 33000 stores a configuration management program 33110, a storage system configuration list 33200, a storage system performance list 33300, a storage cluster configuration list 33400, a device group list 33500, and an alternative path list 33600.

The configuration management program 33110 periodically obtains configuration information and performance information from the virtual storage system 20000, the storage system 25000, and the host computer 10000 to store them in the storage system configuration list 33200 and the storage system performance list 33300. The configuration management program 33110 displays the obtained configuration information and performance information according to a request from the administrator, and accepts setting of a performance management threshold value for a management target device.

The storage system configuration list 33200 stores configuration information obtained from each storage system. The storage system configuration list 33200 stores at least the same information as that held by the virtual volume list 23200 of each virtual storage system 20000.

Figure 10:
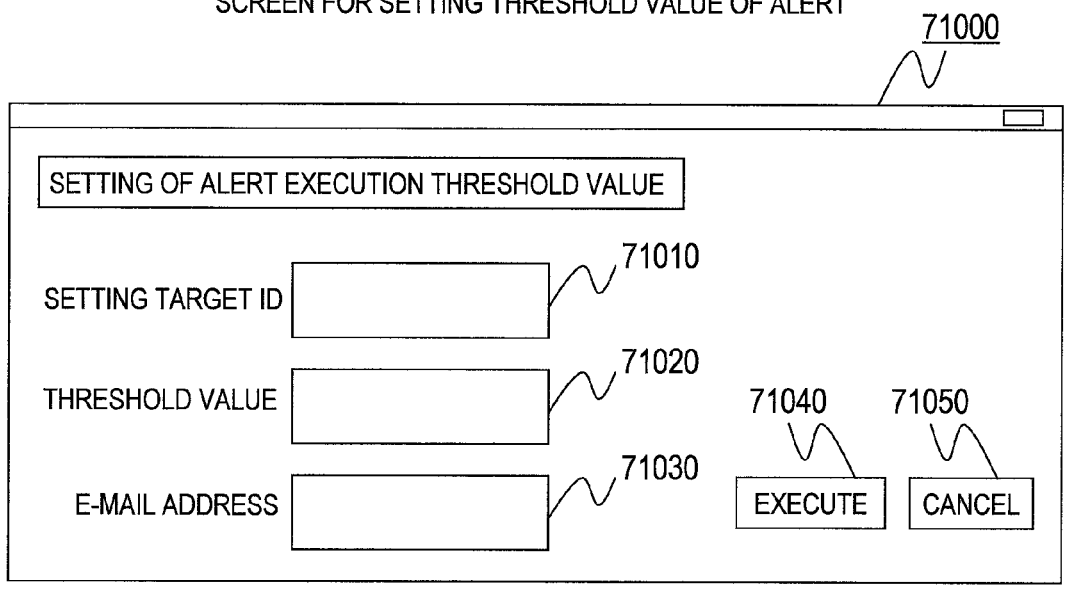
FIG. 10 is an explanatory diagram of a threshold value of alert setting screen to be displayed according to the first embodiment of this invention.

The output unit 34000 outputs an input screen shown in FIG. 10 and a processing result or the like to the administrator. For example, the output unit 34000 may be an optional image display unit.

The input unit 35000 is used by the administrator to enter instructions. For example, the input unit 35000 may be a keyboard, a pointing device, or the like.

The storage system performance list 33300 stores performance information on devices constituting the virtual storage system 20000, the storage system 25000, and the host computer 10000.

The storage cluster configuration list 33400, the device group list 33500, and the alternative path list 33600 are additions according to the first embodiment of this invention. In other words, a conventional management computer 30000 does not include those lists. The lists will be described below in detail.

Figure 6:
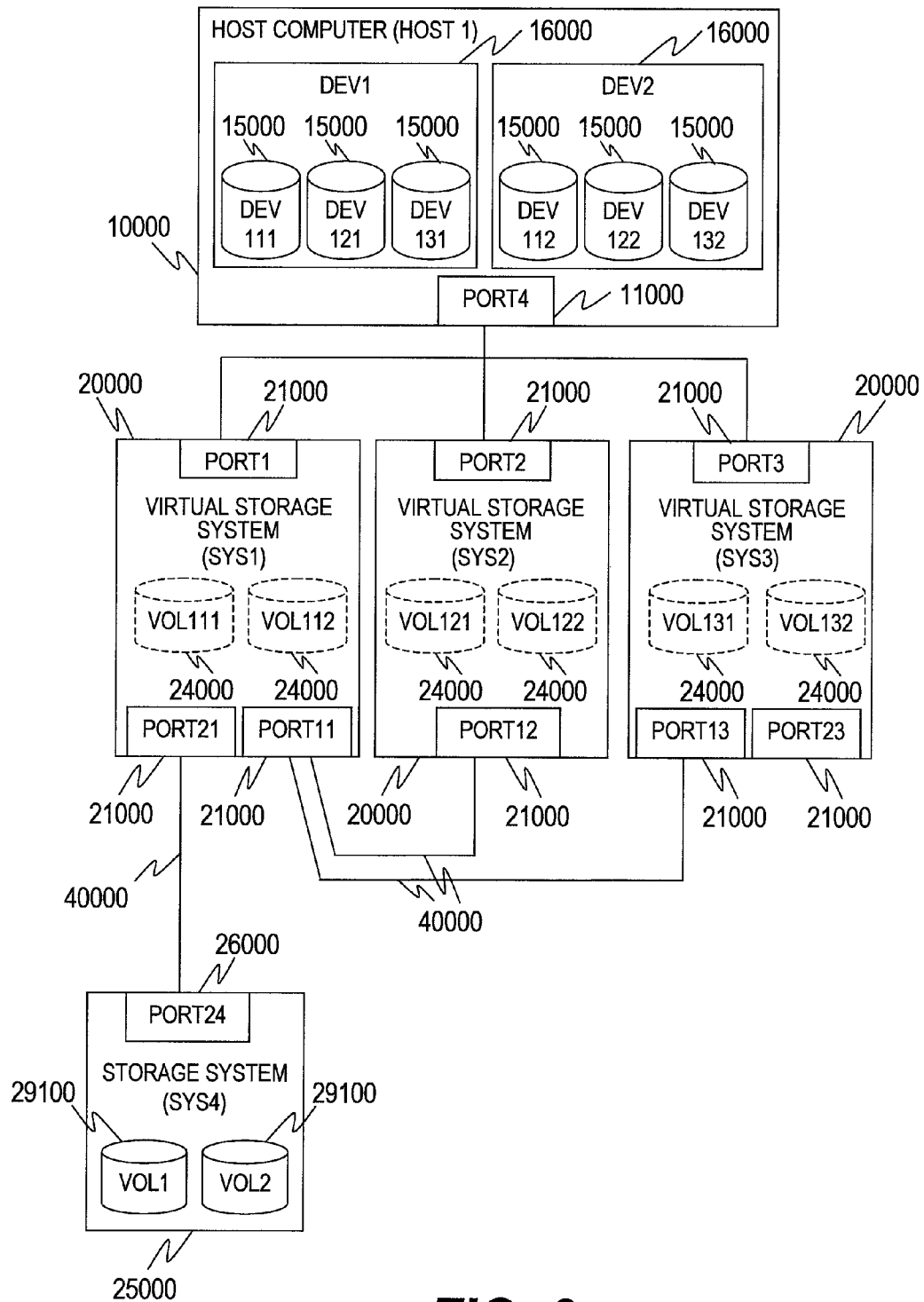
FIG. 6 is an explanatory diagram of a storage cluster configuration according to the first embodiment of this invention.

FIG. 6 is an explanatory diagram of a storage cluster configuration according to the first embodiment of this invention.

Specifically, FIG. 6 shows a storage cluster configuration where the host computer 10000, three virtual storage systems 20000, and the storage system 25000 are combined. The storage system (SYS4) 25000 is connected to the virtual storage system (SYS1) 20000 via the storage area network 40000.

The SYS4 and the SYS1 are unique identifiers (i.e., storage system ID) added to the storage system 25000 and one virtual storage system 20000 in the computer system. Identifiers SYS2 and SYS3 are added to the remaining two virtual storage systems 20000. In the description below, the storage system 25000 may simply be denoted as "SYS1". Each virtual storage system 20000 is similarly represented by an identifier.

A unique identifier "HOST1" is added to the host computer 10000 in the computer system.

The SYS4 includes volumes 29100 respectively having identifiers "VOL1" and "VOL2". The volumes 29100 will simply be referred to as "VOL1" and "VOL2".

The SYS1 includes virtual volumes 24000 respectively having identifiers "VOL111" and "VOL112". The SYS2 includes virtual volumes 24000 respectively having identifiers "VOL121" and "VOL122". The SYS3 includes virtual volumes 24000 respectively having identifiers "VOL131" and "VOL132". Each virtual volume 29100 will be represented below by an identifier such as "VOL111".

The volumes VOL1 and VOL2 respectively correspond to the virtual volumes VOL111 and VOL112 of the SYS1. In other words, upon reception of I/O to the VOL111 and VOL112, the SYS1 issues the I/O to the VOL1 and the VOL2 of the SYS4.

The SYS1 is connected to the SYS2 via the storage area network 40000. The virtual volumes VOL111 and VOL112 of the SYS1 respectively correspond to the virtual volumes VOL121 and VOL122 of the SYS2. In other words, upon reception of I/O to the VOL121 and the VOL122, the SYS2 issues the I/O to the VOL111 and the VOL112 of the SYS1.

The SYS1 is connected to the virtual storage system SYS3 via the storage area network 40000. The virtual volumes VOL111 and VOL112 of the SYS1 respectively correspond to the virtual volumes VOL131 and VOL132 of the SYS3. In other words, upon reception of I/O to the VOL131 and the VOL132, the SYS3 issues the I/O to the VOL111 and the VOL112 of the SYS1.

After all, the I/O from the host computer 10000 to the VOL111, the VOL121, and the VOL131 is executed to the VOL1 of the SYS4 all via the SYS1. The I/O from the host computer 10000 to the VOL112, the VOL122, and the VOL132 is executed to the VOL2 of the SYS4 all via the SYS1.

For example, when the host computer 10000 issues an I/O request for writing data to the VOL111 of the SYS1, the SYS1 issues the I/O request for writing data to the VOL1 of the SYS4. The SYS4 writes the data in the VOL1 according to the request from the SYS1. Accordingly, the data contained in the I/O request issued from the host computer 10000 to write in the virtual volume VOL111 is stored in the volume VOL1 corresponding to the VOL111.

The alternative path management program 14300 of the host computer 10000 recognizes the virtual volumes 24000 of the virtual storage system 20000 connected via the storage area network 40000 as device files 15000. In the example of FIG. 6, the alternative path management program 14300 recognizes six device files 15000 respectively having identifiers (i.e., device file ID) "DEV111", "DEV121", "DEV131", "DEV112", "DEV122", and "DEV132". Each device file 15000 will be denoted below by an identifier such as "DEV111".

Specifically, the alternative path management program 14300 recognizes the virtual volumes VOL111 and VOL112 of the virtual storage system SYS1 as device files DEV111 and DEV112. The alternative path management program 14300 recognizes the virtual volumes VOL121 and VOL122 of the virtual storage system SYS2 as device files DEV121 and DEV122. The alternative path management program 14300 recognizes the virtual volumes VOL131 and VOL132 of the virtual storage system SYS3 as device files DEV131 and DEV132.

The alternative path management program 14300 of the host computer 10000 causes the operating system 14200 to recognize the plurality of recognized device files 15000 as virtual devices 16000. In the example of FIG. 6, the alternative path management program 14300 causes the operating system 14200 to recognize two virtual devices 16000 respectively having identifiers (i.e., virtual device ID) "DEV1" and "DEV2". Each virtual device 16000 will be denoted below by an identifier such as "DEV1".

Specifically, the alternative path management program 14300 causes the operating system 14200 to recognize the device files DEV111, DEV121, and DEV131 as virtual devices DEV1. Additionally, the alternative path management program 14300 causes the operating system 14200 to recognize the device files DEV112, DEV122, and DEV132 as virtual devices DEV2.

The alternative path management program 14300 divides I/O executed from the application 14100 to the virtual device 16000 via the operating system 14200 to the device files 15000. Specifically, the I/O executed to the virtual device DEV1 is divided to the device files DEV111, DEV121, and DEV131 by the alternative path management program 14300. The I/O executed to the virtual device DEV2 is divided to the device files DV112, DEV122, and DEV132 by the alternative path management program 14300.

Each device is connected to the storage area network 40000 via the I/O port. Each I/O port has an identifier (i.e., port ID) unique in the computer system.

Specifically, a port ID of an I/O port 11000 for connecting the host computer HOST1 to the storage area network 40000 is "PORT4". Each port will be denoted below by a port ID such as "PORT4".

Port ID's of I/O ports 21000 for connecting the virtual storage system SYS1 to the storage area network 40000 are "PORT1", "PORT21", and "PORT11". The PORT1 and the PORT21 are respectively connected to the HOST1 and the SYS4 via the storage area network 40000. The PORT11 is connected to the SYS2 and the SYS3 via the storage area network 40000.

Port ID's of I/O ports 21000 for connecting the virtual storage system SYS2 to the storage area network 40000 are "PORT2" and "PORT12". The PORT2 and the PORT12 are respectively connected to the HOST1 and the SYS1 via the storage area network 40000.

Port ID's of I/O ports 21000 for connecting the virtual storage system SYS3 to the storage area network 40000 are "PORT3", "PORT13", and "PORT23". The PORT2 and the PORT13 are respectively connected to the HOST1 and the SYS1 via the storage area network 40000. The PORT23 is not connected to the storage area network 40000 in the example of FIG. 6.

A port ID of an I/O port 26000 for connecting the storage system SYS4 to the storage area network 40000 is "PORT24". The PORT24 is connected to the SYS1 via the storage area network 40000.

After all, each virtual device 16000 is correlated with each volume 29100 one to one. There are a plurality of paths from each virtual device 16000 to the correlated volume 29100. In other words, I/O executed by the operating system 14200 for a certain virtual device 16000 is passed through one of the plurality of paths to reach a volume 29100 correlated with the virtual volume 16000. Then, I/O is executed for the volume 29100.

The configuration of FIG. 6 is only an example. In reality, the host computer 10000 may include an optional number of virtual devices 16000 and an optional number of device files 15000. Each virtual storage system 20000 may include an optional number of virtual volumes 24000. The storage system 25000 may include an optional number of volumes 29100.

Figure 21:
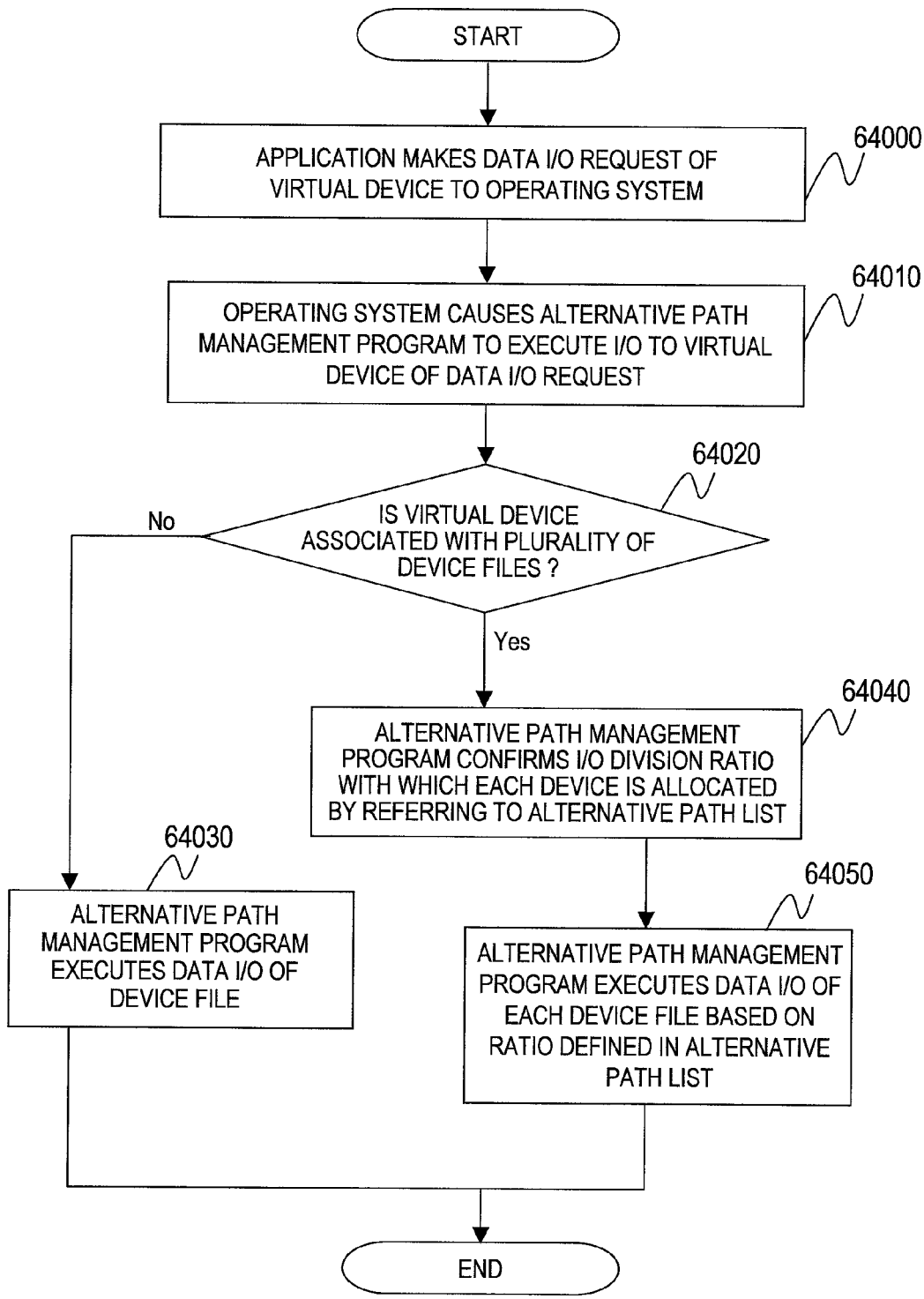
FIG. 21 is a flowchart of I/O division processing executed by an alternative path management program according to the first embodiment of this invention.

FIG. 21 is a flowchart of I/O division processing executed by the alternative path management program 14300 according to the first embodiment of this invention.

When it is necessary to read/write data in a volume provided from the operating system 14200, the application program 14100 of the host computer 10000 makes a data I/O request to the operating system 14200 (Step 64000).

The operating system 14200 that has received the data I/O request causes the alternative path management program 14300 to execute I/O to the virtual device 16000 to which the data I/O request has been made (Step 64010).

The instructed alternative path management program 14300 refers to the alternative path list 14400 to investigate which device file 15000 the virtual device 16000 is correlated with (Step 64020).

When the virtual device 16000 is correlated with only one device file 15000, the alternative path management program 14300 causes the operating system 14200 to directly execute the data I/O request received from the application program 14100 to the device file 15000 (Step 64030).

On the other hand, when the virtual device 16000 is correlated with a plurality of device files 15000, the alternative path management program 14300 refers to the alternative path list 14400 to check an I/O division ratio of each device file (Step 64040).

Then, the alternative path management program 14300 causes the operating system 14200 to execute the data I/O request received from the application program 14100 to each device file 15000 based on the set I/O division ratio (Step 64050).

The flowchart of the I/O division processing executed by the alternative path management program 14300 according to the first embodiment of this invention has been described.

FIG. 7 is an explanatory diagram of the alternative path list 14400 held by the host computer 10000 according to the first embodiment of this invention.

The alternative path list 14400 includes six fields 14410 to 14460.

A virtual device ID for identifying each virtual device 16000 in the host computer 10000 is registered in the field 14410.

A device file ID for identifying a device file 15000 corresponding to each virtual device 16000 in the host computer 10000 is registered in the field 14420.

A connected storage system ID for identifying a virtual storage system 20000 including a virtual volume 24000 corresponding to each device file 15000 is registered in the field 14430.

A connected port ID for identifying a port 21000 used by the virtual storage system 20000 including the virtual volume 24000 corresponding to each device file 15000 to connect with the host computer 10000 is registered in the field 14440.

A connected volume ID for identifying a virtual volume 24000 corresponding to each device file 15000 is registered in the field 14450.

A value indicating a ratio of a data amount when the alternative path management program 14300 divides I/O to the device files 15000 is registered in the field 14460.

FIG. 7 shows an example of a specific value registered in the alternative path list 14400 held by the host computer 10000.

In this example, the alternative path management program 14300 of the host computer 10000 divides I/O of the virtual device DEV1 to device files DEV111, DEV121, and DEV131.

The DEV111 is connected to the virtual volume VOL111 of the virtual storage system SYS1 via the PORT1. Similarly, the DEV121 is connected to the VOL121 of the SYS2 via the PORT2. The DEV131 is connected to the VOL131 of the SYS3 via the PORT3.

The alternative path management program 14300 divides the I/O of the virtual device DEV1 to the device files DEV111, DEV121, and DEV131 at rates of 70%, 20% and 10%.

FIG. 8 is an explanatory diagram of the virtual volume list 23200 held by the virtual storage system 20000 according to the first embodiment of this invention.

The virtual volume list 23200 includes five fields 23210 to 23250.

A virtual volume ID for identifying each virtual volume 24000 in the virtual storage system 20000 is registered in the field 23210.

A port ID for identifying a port used for connection with a storage system including a volume corresponding to each virtual volume 24000 is registered in the field 23220.

A connected storage system ID for identifying a system including a volume corresponding to each virtual volume 24000 is registered in the field 23230.

A connected port ID for identifying a port used by a storage system including a volume corresponding to each virtual volume 24000 to connect with the volume 29100 is registered in the field 23240.

A connected volume ID for identifying a volume corresponding to each virtual volume 24000 is registered in the field 23250.

FIG. 8 shows an example of a specific value registered in the virtual volume list 23200 held by the virtual storage system 20000. In this example, the virtual volumes VOL111 and VOL112 of the virtual storage system 20000 are respectively connected to the VOL1 and the VOL2 of the SYS4 via the PORT21 and the PORT24.

FIG. 9 is an explanatory diagram of the storage system performance list 33300 held by the management computer 30000 according to the first embodiment of this invention.

The storage system performance list 33300 includes four fields 33310 to 33340.

A system ID which is an identifier of a storage system 25000, a virtual storage system 20000, or a host computer 10000 to which a device of a management target belongs is registered in the field 33310.

A device ID which is an identifier of a management target device is registered in the field 33320.

A performance value actually measured by the management target device is stored in the field 33330. In the example of FIG. 9, an I/O amount per unit time of the management target device (i.e., data amount input to/output from the device per unit time) is registered in the field 33330. The I/O amount is obtained from the storage system 25000 or the like to which the management target device belongs by the management computer 30000.

A threshold value of a performance value for alert execution is registered in the field 33340. The threshold value is entered from the administrator.

When the I/O amount per unit time 33330 of the management target device exceeds a threshold value of alert 33340, the management computer 30000 transmits an alert to the administrator by means such as e-mail. Accordingly, a value registered in the threshold value of alert 33340 is set in the management target device to determine whether the management computer 30000 transmits an alert.

FIG. 9 shows an example of a specific value registered in the storage system performance list 33300 held by the management computer 30000. In this example, an I/O amount 200 per unit time is generated in the volume VOL111 in the storage system SYS1. When the I/O amount per unit time of the VOL111 exceeds 1000, the management computer 30000 transmits an alert to the administrator.

The I/O amount per unit time has been taken as an example of a performance value of the device managed by the management computer 30000. However, a performance value managed by the management computer 30000 may be a value other than such (e.g., the number of I/O times per unit time). The management computer 30000 may simultaneously manage a plurality of kinds of performance values.

FIG. 10 is an explanatory diagram of a threshold value of alert setting screen displayed according to the first embodiment of this invention.

A threshold value of alert setting screen 71000 shown in FIG. 10 is an example of a screen displayed in the output unit 34000 of the management computer 30000 when the storage system administrator sets a threshold value for managing performance of a device by using the management computer 30000. In the threshold value of alert setting screen 71000, the administrator specifies an ID of a device in which a threshold value is set (table 71010), a threshold value (table 71020), and an e-mail address to which exceeding of the threshold value is notified (table 71030). Upon checking of specified parameters, the administrator presses a "CHECK" button 71040 when volume creation is continued, and a "CANCEL" button 71050 when the volume creation is canceled. When the "CANCEL" button is pressed, the configuration management program 33110 of the management computer 30000 finishes the process without setting any threshold values. When the "CHECK" button is pressed, the configuration management program 33110 receives a threshold value setting instruction from the administrator, and registers a specified threshold value in the field 33340 of the storage system performance list 33300.

Next, referring to FIGS. 11 to 13, the lists 33400 to 33600 added according to the first embodiment of this invention, and, processing executed by the configuration management program 33110 of this embodiment will be described. Before the description, problems of conventional system and program configurations will be explained. In the case of the conventional system and program configurations, when the administrator sets a threshold value of a performance value of the device, there is a fear that the threshold value may be set without awareness of an I/O amount ratio of paths set by the alternative path management program 14300. A result is a problem that the set threshold value cannot exhibit proper effects.

For example, in the configuration of FIG. 6, it is presumed that when an I/O division ratio of 70% is set in the path through the VOL111, an I/O division ratio of 20% is set in the path through the VOL121, and an I/O division ratio of 10% is set in the path through the VOL131, threshold values of "100" are set in the VOL111, the VOL121, and the VOL131. In this case, I/O is divided to the VOL121 only by 2/7 of the VOL111, and I/O is divided to the VOL131 only by 1/7 of the VOL111. Thus, as long as the threshold value "100" is set in the VOL111, the I/O amounts through the VOL121 and the VOL131 never exceed the threshold value. In other words, the threshold values "100" set in the VOL121 and the VOL131 are not effective.

FIG. 11 is an explanatory diagram of the storage cluster configuration list 33400 held by the management computer 30000 according to the first embodiment of this invention.

The storage cluster configuration list 33400 includes seven fields 33410 to 33470.

A virtual device ID for identifying each virtual device 16000 in the host computer 10000 is registered in the field 33410.

A device file ID for identifying a device file 15000 corresponding to each virtual device 16000 in the host computer 10000 is registered in the field 33420.

A virtual storage system ID for identifying a virtual storage system 20000 including a virtual volume 24000 corresponding to each device file 15000 is registered in the field 33430.

A virtual volume ID for identifying a virtual volume 24000 corresponding to each device file 15000 is registered in the field 33440.

A connection source storage system ID for identifying a storage system 25000 including a volume 29100 corresponding to each virtual volume 24000 is registered in the field 33450.

A volume ID for identifying a volume 29100 corresponding to each virtual volume 24000 is registered in the field 33460.

A value indicating whether a path from the host computer 10000 to the volume 29100 is a main path (master route) or a subpath (slave route) is registered in the field 33470.

The main path (master route) is an information transmission path from the virtual device 16000 of the host computer 10000 through one virtual storage system 20000 to the volume 29100 of the storage system 25000. On the other hand, the subpath (slave route) is an information transmission path from the virtual device 16000 of the host computer 10000 via two virtual storage systems 20000 to the volume 29100 of the storage system 25000.

FIG. 11 shows an example of a specific value registered in the storage cluster configuration list 33400 held by the management computer 30000. In this example, the alternative path management program 14300 of the host computer 10000 divides I/O of the virtual device DEV1 to the device files DEV111, DEV121 and DEV131.

The device file DEV111 is connected to the volume VOL1 of the storage system SYS4 via the virtual volume VOL111 of the virtual storage system SYS1. The path is a master route.

Similarly, the device file DEV121 is connected to the VOL1 of the storage system SYS4 via the virtual volume VOL121 of the virtual storage system SYS2 and the virtual volume VOL111 of the virtual storage system SYS1. The path is a slave route. The device file DEV131 is connected to the volume VOL1 of the storage system SYS4 via the virtual volume VOL131 of the virtual storage system SYS3 and the virtual volume VOL111 of the virtual storage system SYS1. The path is a slave route.

FIG. 12 is an explanatory diagram of the device group list 33500 held by the management computer 30000 according to the first embodiment of this invention.

Information indicating devices constituting a device group present in the computer system is registered in the device group list 33500.

The device group will be described. As described above, according to this embodiment, there are a plurality of paths from one virtual device 16000 to one volume 29100. A group of devices belonging to each path (i.e., devices through which the paths pass) is a device group of this embodiment. For example, in the examples of FIGS. 6 and 12, there are three paths from the DEV1 to the VOL1. Those three paths respectively pass through the VOL111, the VOL121, and the VOL131. In this case, the VOL111, the VOL121, and the VOL131 constitute a device group.

The device group list 33500 includes fields 33510 and 33520. A group ID which is an identifier of a device group managed by the management computer 30000 is registered in the field 33510. An identifier of a device constituting a group among devices constituting the plurality of paths from the same virtual device 24000 to the same volume 29100 in the storage cluster configuration list 33400 is registered in the field 33520. When the registered device is a device constituting a main path, the information indicating that the device constitutes a main path is registered in the field 33520.

FIG. 12 shows an example of a specific value registered in the device group list 33500 held by the management computer 30000. In this example, the virtual volumes VOL111, VOL121, and VOL131 registered in the storage cluster list 33400 constitute a group in a path group from the same virtual volume 16000 (DEV1 in the example) to the same volume 29100 (VOL1 in the example). Those devices are registered as a device group having an ID of G3.

Contents of the alternative path list 33600 held by the management computer 30000 is similar to the alternative path list 14400 held by the host computer 10000, and thus description thereof will be omitted.

Figure 13:
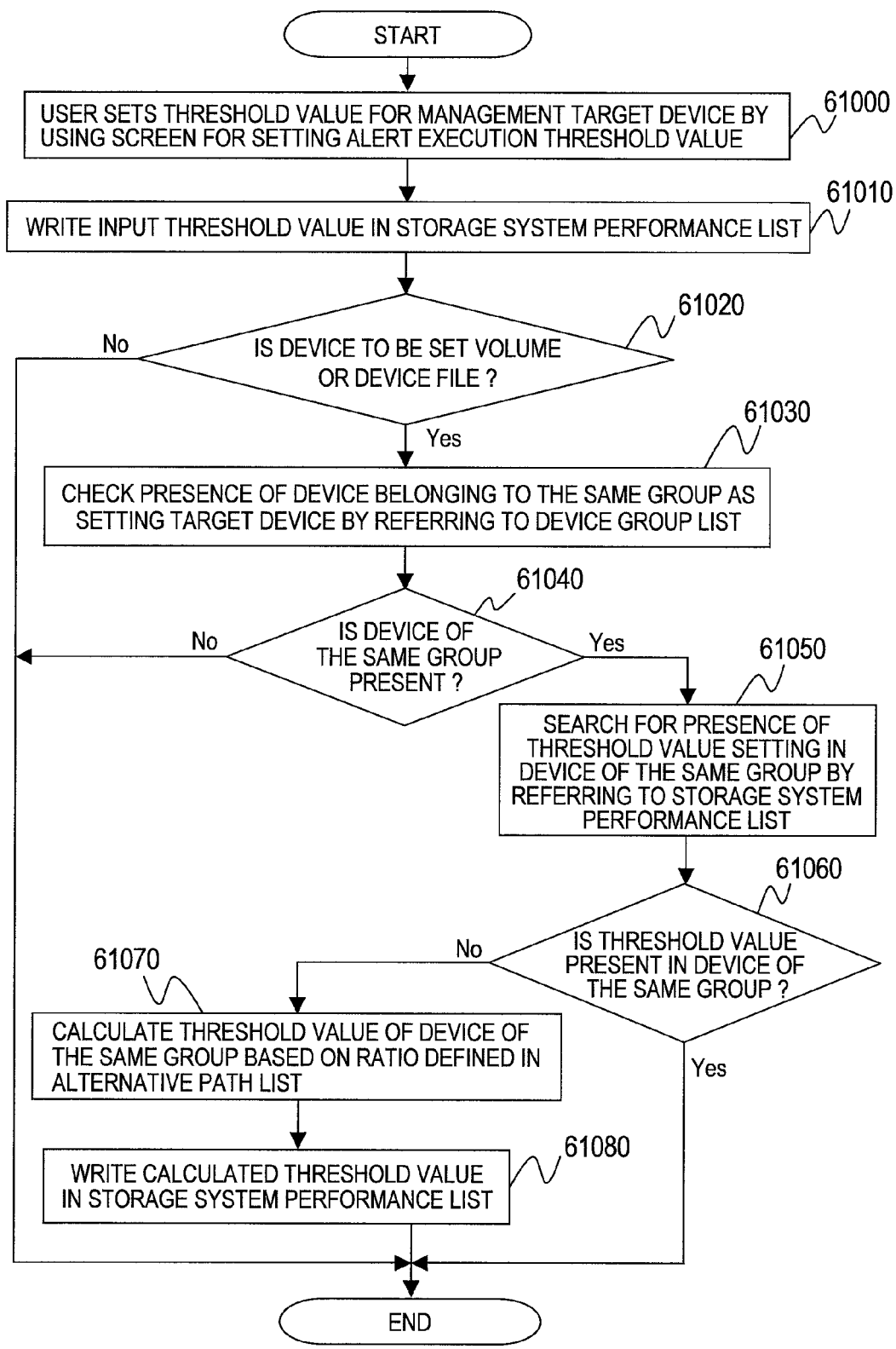
FIG. 13 is a flowchart of threshold value setting processing executed by a configuration management program according to the first embodiment of this invention.

FIG. 13 is a flowchart of threshold value setting processing executed by the configuration management program 33110 according to the first embodiment of this invention.

The storage system administrator sets a performance management threshold value of each device by using the threshold value of alert setting screen 71000 provided from the management computer 30000 (Step 61000).

Upon reception of the threshold value, the configuration management program 33110 writes the entered threshold value in the storage system performance list 33300 (Step 61010). Specifically, a value entered in a threshold value 71020 is registered in a threshold value of alert 33340 corresponding to the same device ID 33320 of a value entered to a setting target ID 71010.

Next, the configuration management program 33110 determines whether the setting target device of a threshold value is a volume (virtual volume 24000 or volume 29100) or a device file 15000 (Step 61020).

If it is determined in Step 61020 that the setting target device is neither a volume nor a device file 15000, for example, the setting target device is a port 21000 or the like. In this case, a threshold value cannot be calculated only based on the I/O division ratio defined in the alternative path list 33600. Accordingly, the configuration management program 33110 finishes the process.

Figure 14:
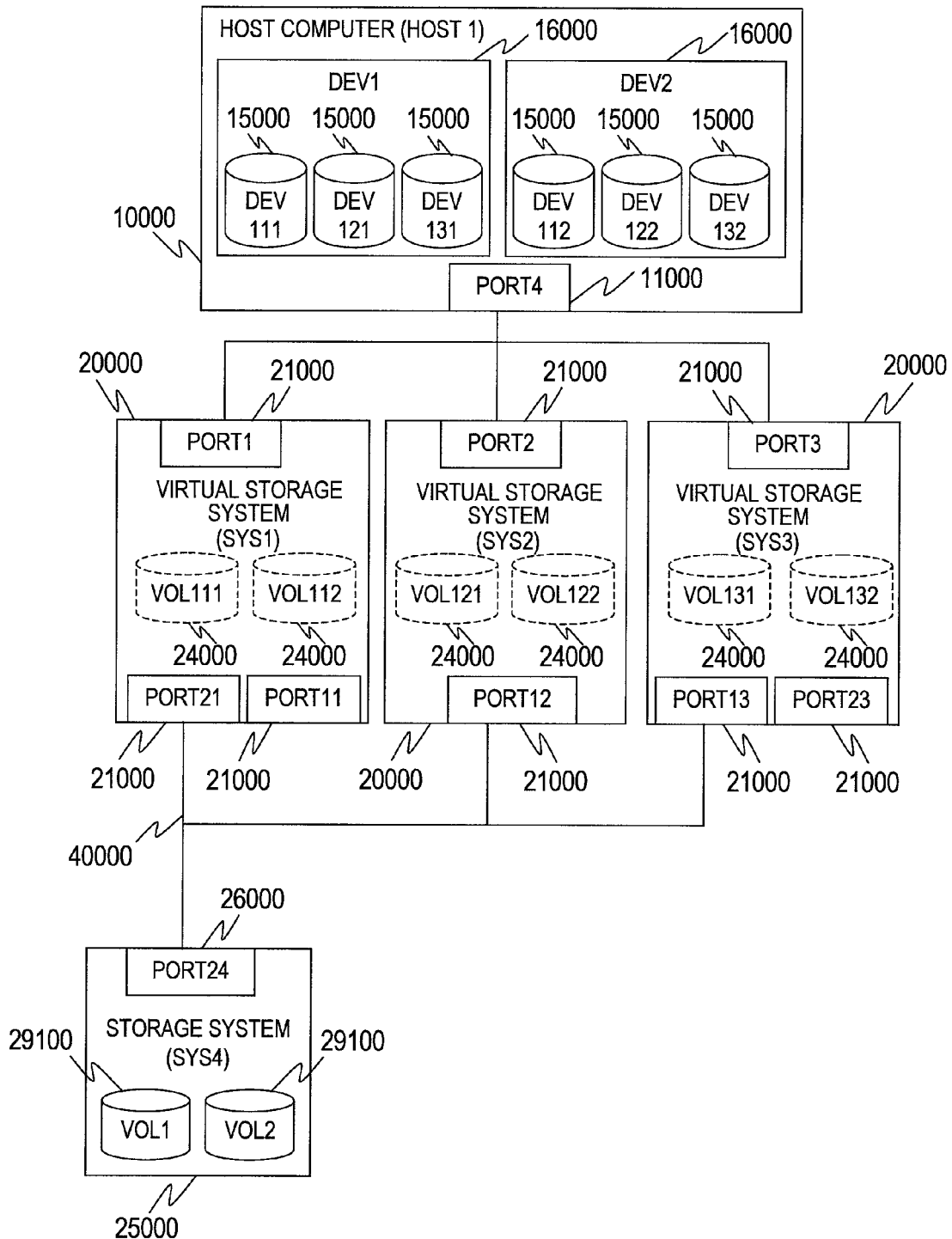
FIG. 14 is an explanatory diagram of a storage cluster configuration according to a modified example of the first embodiment of this invention.

On the other hand, if it is determined in Step 61020 that the setting target device is one of a volume and a device file 15000, the configuration management program 33110 then refers to the device group list 33500 to investigate whether a device belonging to the same device group as that of the setting target device is present (Step 61030). In the description of FIG. 14 below, a device belonging to the same device group as that of the setting target device will be referred to as "device of the same group".

Then, the process branches based on a result of the investigation of Step 61030 (Step 61040).

If no device of the same group is present (Step 61040), it is not necessary to set threshold values of devices other than the setting target device based on the I/O division ratio. Thus, the configuration management program 33110 finishes the process.

On the other hand, if a device of the same group is present (Step 61040), the configuration management program 33110 refers to the storage system performance list 33300 to investigate whether a threshold value has been set for the device of the same group (Step 61050). Specifically, if there is a value registered in the threshold value of alert 33340 corresponding to the device ID 33320 of the device of the same group, a threshold value has been set for the device.

Next, the process branches based on a result of Step 61050 (Step 61060).

If a threshold value has been set for the device of the same group (Step 61060), it is not necessary to set a threshold value again for the device. Accordingly, the configuration management program 33110 finishes the process without setting any threshold value for the device of the same group.

On the other hand, if no threshold value has been set for the device of the same group (Step 61060), the configuration management program 33110 refers to the alternative path list 33500 to calculate a threshold value to be set for the device of the same group (Step 61070).

Then, the configuration management program 33110 writes the calculated threshold value in the threshold value of alert 33340 of the storage system performance list 33300 (Step 61080).

A specific example of a threshold value calculation method of Step 61070 will be described. In the configuration of FIG. 6, when the I/O division ratios of the DEV111, the DEV121, and the DEV131 are respectively 70%, 20%, and 10% as shown in FIG. 7, it is expected that I/O amount ratios via the VOL111, the VOL121, and the VOL131 will be 100:20:10. It is because I/O to the DEV121 and the DEV131 passes through the VOL111, and after all I/O's reaching the VOL1 all pass through the VOL111. In such a case, when a threshold value "100" is set in the VOL111, threshold values "20" and "10" are respectively set in the VOL121 and the VOL131 according to the expected I/O ratios.

Thus, threshold values proportional to the I/O amount ratios expected to pass through the devices are set in the devices.

Subsequently, when a real I/O amount via each path exceeds the threshold value set in the device (specifically, when the value registered in the I/O amount per unit time 33330 exceeds the value registered in the threshold value of alert 33340), the configuration management program 33110 displays a warning in the display unit 34000.

The threshold value calculation method is in no way limitative of realizing means of this invention. The threshold value may be calculated by other methods. However, when it is expected that I/O amounts via the devices will differ, a threshold value of a device of an expected high I/O amount is set larger than that of a device of an expected low I/O amount. When the administrator sets a threshold value lower than that of the device of an expected low I/O amount in the device of an expected high I/O amount, the management computer 30000 may display a warning in the threshold value of alert setting screen 71000.

The threshold value setting function of this embodiment of this invention has been described. The configuration of the storage system and the host computer 10000 may be as shown in FIG. 14. A configuration of a computer system in such a case will be described. Differences only from the configuration of FIG. 6 will be described.

FIG. 14 is an explanatory diagram of a storage cluster configuration according to a modified example of the first embodiment of this invention.

FIG. 14 shows a storage cluster configuration where a host computer 10000, three virtual storage systems 20000, and a storage system 25000 are combined. The SYS4 is connected to the SYS1, SYS2 and SYS3 via a storage area network 40000.

A volume VOL1 of the SYS 4 corresponds to the virtual volume VOL111 of the SYS1, the virtual volume VOL121 of SYS2, and the virtual volume VOL131 of the SYS3. A volume VOL2 of the SYS4 corresponds to the virtual volume VOL112 of the SYS1, the virtual volume VOL122 of the SYS2, and the virtual volume VOL132 of the SYS3. In other words, I/O from the host computer 10000 to the VOL111, the VOL121, and the VOL131 is executed for the VOL1 of the SYS4 via the SYS1, the SYS2, and the SYS3.

In this case, the VOL111, the VOL121, and the VOL131 constitute one device group. On the other hand, the VOL112, the VOL122, and the VOL132 constitute another device group.

In the configuration shown in FIG. 14, each path from a virtual volume 16000 to a volume 29100 passes through only one virtual storage system 21000. In other words, there is no path through two virtual storage systems 21000. Accordingly, in the configuration shown in FIG. 14, different from the configuration of FIG. 6, paths are not classified into main and sub paths.

However, for example, virtual storage systems 21000 may be different from one another in performance. For example, the SYS1 may be higher in performance as compared with the SYS2 and the SYS3. In such a case, an I/O division ratio of a path through the virtual volume 24000 of the SYS1 may be set to be higher than those of the other paths. In this case, the path through the virtual volume 24000 of the SYS1 can be treated as a main path.

Alternatively, if each virtual storage system 21000 executes processing in addition to the management of virtual volume 24000, loads of the processing operations may be different. For example, a load of the SYS1 may be lower as compared with performance of the SYS2 and the SYS3. In such a case, an I/O division ratio of the path through the virtual volume 24000 of the SYS1 may be set to be higher than those of the other paths. In this case, the path through the virtual volume 24000 of the SYS1 can be treated as a main path.

Thus, in the configuration shown in FIG. 14, it is possible to set a threshold value of each device by executing the processing of FIG. 13.

According to the first embodiment of this invention, the administrator using the management program can set a threshold value calculated according to the I/O division ratio set in the alternative path list 33600 for the management target device. Thus, even when the I/O division ratios of the virtual volumes 24000 of the virtual storage system 20000 have been set, it is possible to set proper threshold values for the virtual volumes 24000 according to the I/O division ratios.

Next, a second embodiment of this invention will be described.

According to the second embodiment, a storage system management program first obtains a data division ratio from an alternative path management program of a host computer 10000. Then, when a change occurs in device configuration as a result of balance readjustment of storage system processing efficiency and I/O loads among a plurality of virtual storage systems, a data division ratio and threshold values of related devices are calculated and set.

A configuration of a computer system of the second embodiment and management information held by each storage system are similar to those of the first embodiment. Differences of the second embodiment from the first embodiment will be described below.

The virtual storage system 20000 includes a function of readjusting a balance of storage system processing efficiency and I/O loads among a plurality of virtual storage systems 20000 when there occurs a reduction in the storage system processing efficiency of the specific virtual storage system 20000 due to concentration of the load. As an example, a case where a load of a virtual storage system SYS1 is increased is assumed.

Figure 15:
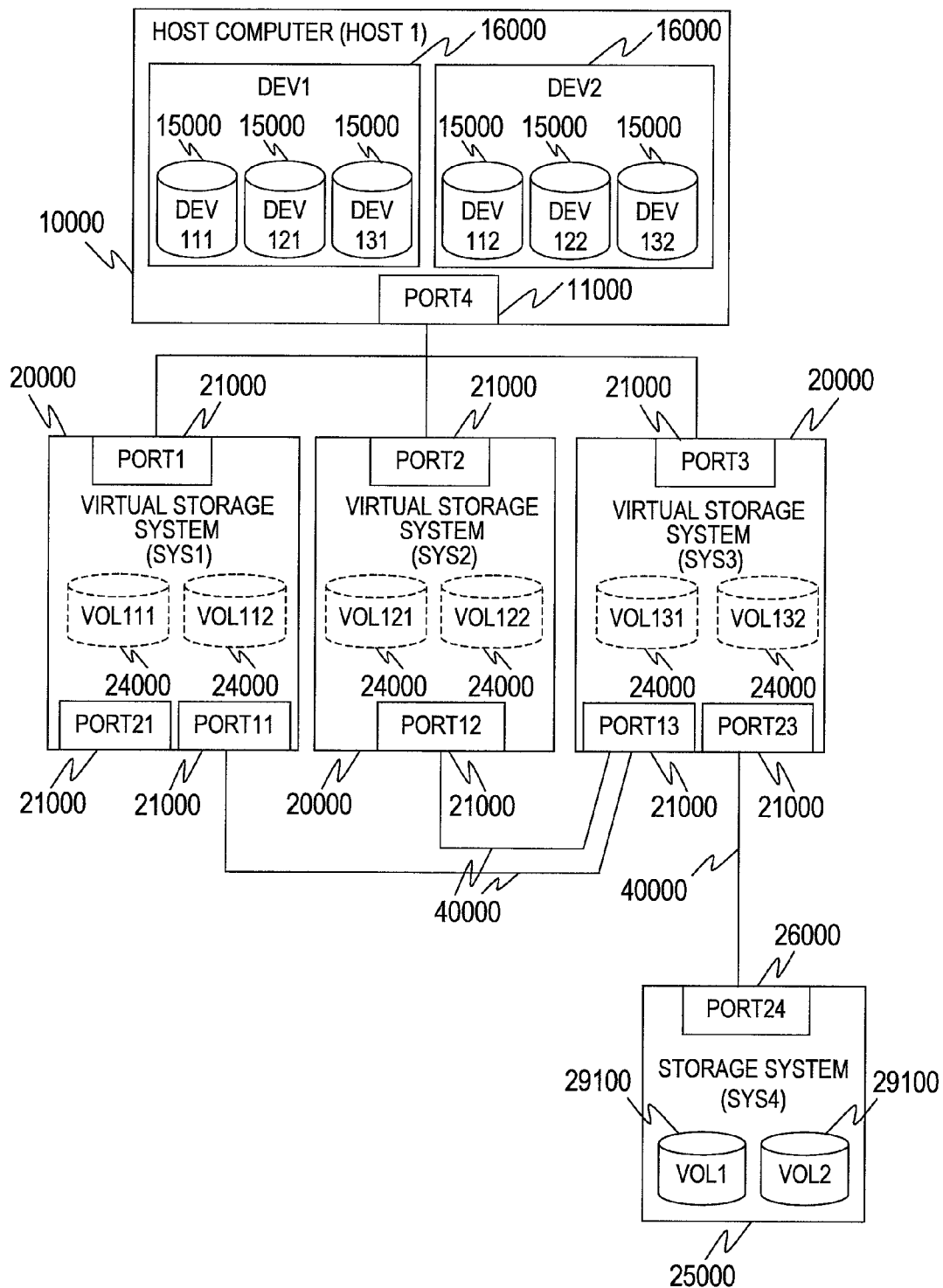
FIG. 15 is an explanatory diagram showing a device configuration after readjustment of a load balance according to a second embodiment of this invention.

FIG. 15 is an explanatory diagram showing a device configuration after readjustment of a load balance according to the second embodiment of this invention.

The SYS4 is connected to the SYS3 via a storage area network 40000. Volumes VOL1 and VOL2 of the SYS4 correspond to virtual volumes VOL131 and VOL132 of the SYS3. The SYS3 is connected to the SYS2 via the storage area network 40000. The virtual volumes VOL131 and VOL132 of the SYS3 correspond to virtual volumes VOL121 and VOL122 of the SYS2, respectively. The SYS3 is connected to the SYS1 via the storage area network 40000. The virtual volumes VOL131 and VOL132 of the SYS3 respectively correspond to virtual volumes VOL111 and VOL112 of the SYS1.

In the configuration shown in FIG. 6, the I/O's from the virtual volumes DEV1 and DEV2 to the volumes VOL1 and VOL2 all pass through the SYS1. As a result, loads concentrate in the SYS1. In the configuration shown in FIG. 15, however, the load of the SYS1 can be reduced by causing the SYS3 to play a role of the SYS1.

However, as a result of a change in the device configuration as shown in FIG. 15, there is a fear that an I/O division ratio of each path, a threshold value set for a device by an administrator based on the alternative path management program, or the like may not math the device configuration. Thus, the set threshold value, I/O division ratio, or the like may not exhibit proper effects. According to the second embodiment, when such a change occurs in the device configuration, a threshold value, an I/O division ratio, or the like is set again to match the changed device configuration.

Figure 16:
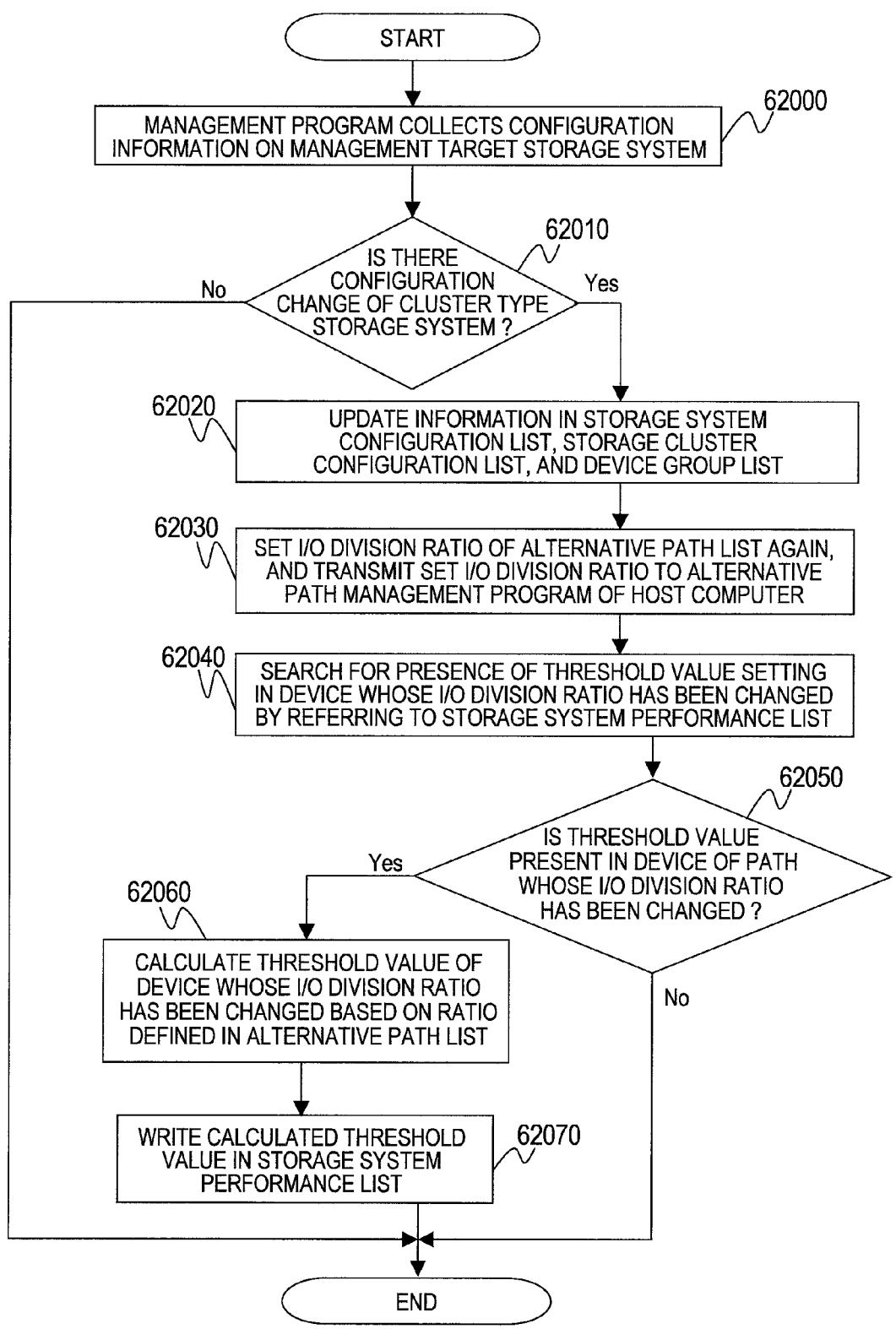
FIG. 16 is a flowchart of threshold value reviewing processing executed by a configuration management program according to the second embodiment of this invention.

FIG. 16 is a flowchart of threshold value reviewing processing executed by a configuration management program 33110 according to the second embodiment of this invention.

The management computer 30000 periodically obtains configuration information from the storage system 25000, the virtual storage system 20000, and the host computer 10000 managed by the management computer 30000 (Step 62000). In this case, the configuration management program 33110 compares the obtained configuration information with contents of a storage system configuration list 33200 to determine whether the load balance readjustment has caused a change in device configuration (Step 62010).

If it is determined in Step 62010 that there has been no configuration change, it is not necessary to review threshold values, so the configuration management program 33110 finishes the process.

On the other hand, if it is determined in Step 62010 that the configuration has been changed, the configuration management program 33110 updates contents of the storage system configuration list 33200, a storage cluster configuration list 33400, and a device group list 33500 to match the configuration information obtained in Step 62000 (Step 62020). In this case, the configuration management program 33110 determines which of the paths from the virtual device 16000 to the volume 29100 is a main path based on the configuration information.

For example, as in the case of the first embodiment, a path where the number of virtual storage systems 20000 (or virtual volumes 24000) passed through in the way from the virtual device 16000 to the volume 29100 is small may be determined to be the main path.

When the main path and the subpath are changed, the configuration management program 33110 recalculates an I/O division ratio 14460 of the alternative path list 33600. As one of recalculation methods, a method of substituting I/O division ratios of the main path and the subpath is available. Specifically, an I/O division ratio set in the main path before the configuration is changed may be set in a main path after the configuration change, and an I/O division ratio set in the subpath before the configuration change may be set in a subpath after the configuration change.

Then, the configuration management program 33110 transmits the updated I/O division ratio to the alternative path management program 14300 of the host computer 10000 (Step 62030). The alternative path management program 14300 updates the alternative path list 14400 by registering the received I/O division ratio in the I/O division ratio 14460 of the alternative path list 14400.

The I/O division ratio in Step 62030 may be set by other methods based on correspondence between the volume 29100 and the virtual volume 24000. For example, I/O division ratios of the main path and the subpath may be preset by the administrator. However, when the number of virtual volumes through which the subpath passes is larger than that through which the main path passes, an I/O division ratio lower than that set in the main path is set in the subpath.

Then, the configuration management program 33110 refers to a storage system performance list 33300 to investigate whether a threshold value has been set for the device of the path whose I/O division ratio has been changed (Step 62040).

The process branches based on a result of Step 62040 (Step 62050).

If no threshold value has been set in the device of the path of the changed I/O division ratio (Step 62050), the configuration management program 33110 finishes the process without setting any threshold value for the device.

On the other hand, if a threshold value has been set for the device of the path of the changed I/O division ratio (Step 62050), the configuration management program 33110 refers to the alternative path list 33500 to calculate a threshold value to be set for the device of the path of the changed I/O division ratio (Step 62060).

Then, the configuration management program 33110 registers the calculated threshold value in a threshold value of alert 33340 of the storage system performance list 33300 (Step 62070).

A specific example of a threshold value calculation method of Step 62060 will be described. In the configuration of FIG. 6, it is presumed that the I/O division ratios of the DEV111, the DEV121, and the DEV131 are respectively set to 70%, 20%, and 10%, and "100", "20", and "10" are set as threshold values of the VOL111, the VOL121, and the VOL131.

Subsequently, when the configuration of the computer system is changed as shown in FIG. 15, I/O division ratios of the DEV111, the DEV121, and the DEV131 are set to 10%, 20%, and 70%, respectively. In this case, according to the I/O division ratios, a threshold value of the VOL111 is set to "10", and a threshold value of the VOL131 is set to "100". In this case, the configuration management program 33110 subtracts "90" equivalent to a threshold value reduction of the VOL111 from the threshold value set in PORT1 through which I/O to the VOL111 passes among ports 21000 of the virtual storage system SYS1 including the VOL111. Further, the configuration management program 33110 adds "90" equivalent to a threshold value increase of the VOL131 to the threshold value set in PORT3 through which I/O to the VOL131 passes.

The threshold value calculation method is in no way limitative of realizing means of this invention. The threshold values may be calculated by other methods.

The threshold value reviewing processing of this embodiment has been described.

Thus, according to the second embodiment of this invention, even when the device configuration is changed as a result of balance readjustment of storage system processing efficiency and I/O loads among the plurality of virtual storage systems 20000, a threshold value of each device can be calculated and set to match the changed device configuration.

Next, a third embodiment of this invention will be described.

According to the third embodiment, a storage system administrator registers data division ratios after device configuration change beforehand in a storage system management program. Then, when the device configuration is changed as a result of a stop of I/O processing of a specific virtual storage system 20000 because of a system fault or the like, data division ratios and threshold values of related devices are calculated and set.

A configuration of a computer system and management information held by each storage system of the third embodiment are similar to those of the first embodiment except for the following. Differences of the third embodiment from the first embodiment will be described below.

Each virtual storage system 20000 has a function of readjusting system configuration among a plurality of virtual storage systems 20000 when data I/O is stopped in one of the virtual storage systems 20000. For example, such a data I/O stop occurs when the virtual storage system 20000 shuts down due to a fault. As an example, a case where the virtual storage system SYS1 of FIG. 6 shuts down is assumed.

Figure 17:
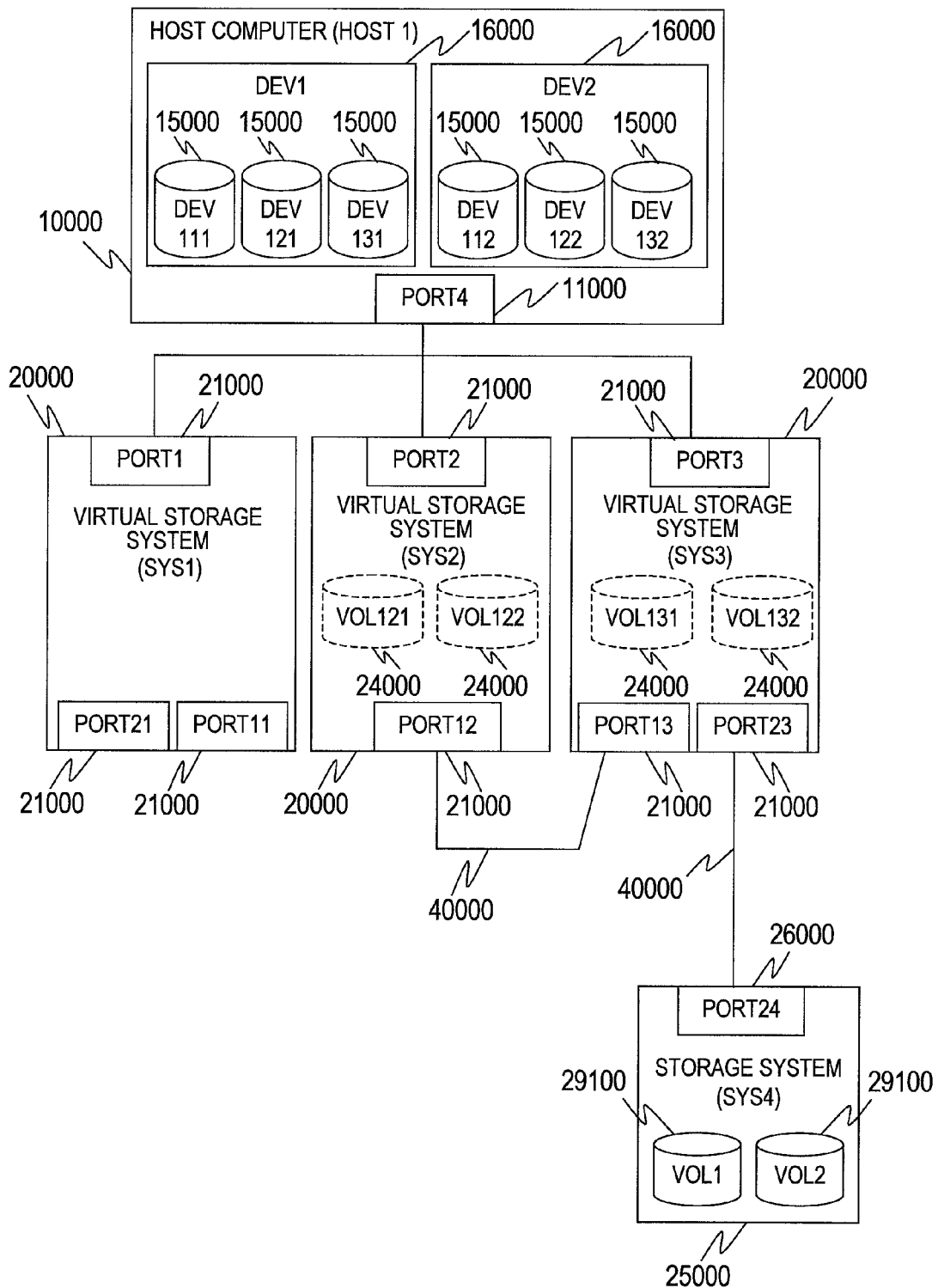
FIG. 17 is an explanatory diagram showing a device configuration after readjustment of a load balance according to a third embodiment of this invention.

FIG. 17 is an explanatory diagram showing a device configuration after readjustment of a load balance according to the third embodiment of this invention.

The SYS4 is connected to the SYS3 via a storage area network 40000. Volumes VOL1 and VOL2 of the SYS4 correspond to virtual volumes VOL131 and VOL132 of the SYS3. The SYS3 is connected to the SYS2 via the storage area network 40000. The virtual volumes VOL131 and VOL132 of the SYS3 correspond to virtual volumes VOL121 and VOL122 of the SYS2, respectively.

However, as a result of a change in the device configuration as shown in FIG. 17, there is a fear that an I/O division ratio of each path, a threshold value set for a device by an administrator based on the alternative path management program, or the like may not match the device configuration. Thus, the set threshold value, I/O division ratio, or the like may not exhibit proper effects. According to the third embodiment, when such a change occurs in the device configuration, a threshold value, an I/O division ratio, or the like is set again to match the changed device configuration.

Figures 18, 19:
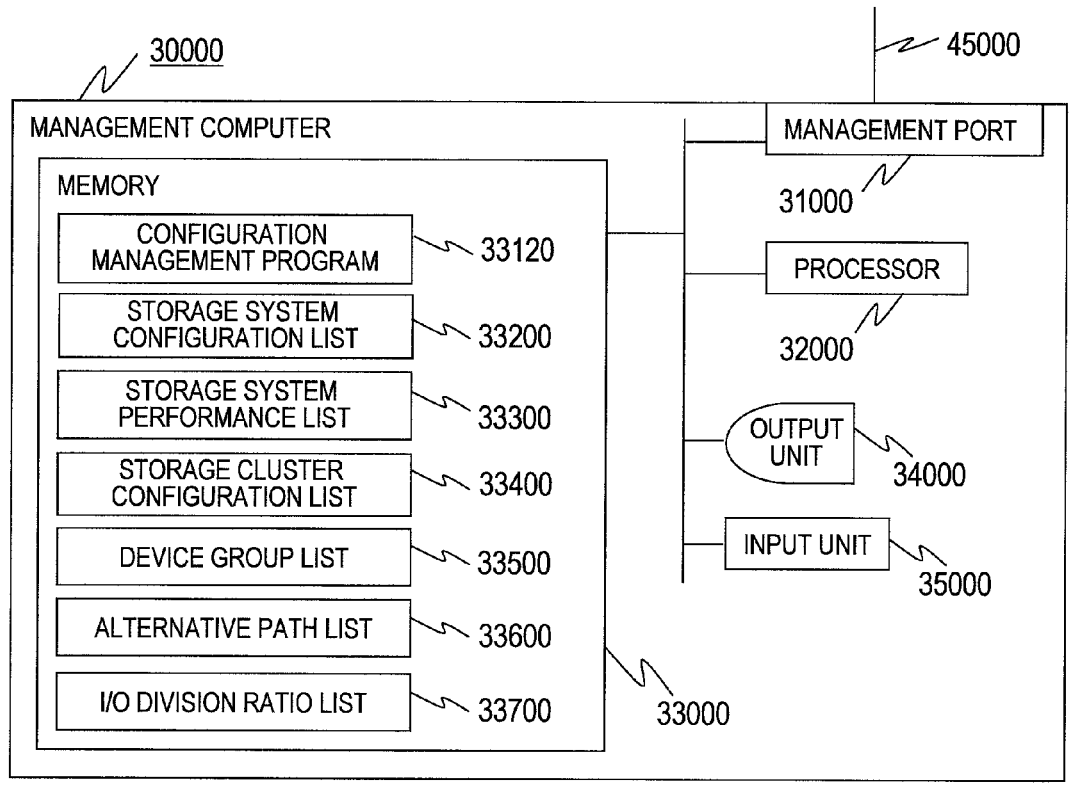
FIG. 18 is a block diagram showing a configuration of a management computer according to the third embodiment of this invention.
FIG. 19 is an explanatory diagram of an I/O division ratio list held by the management computer according to the third embodiment of this invention.

Next, the configuration of the computer system of the third embodiment will be described. FIG. 18 shows a configuration of a management computer 30000, and FIG. 19 shows management information held by the management computer 30000. Configurations of a host computer 10000, the virtual storage system 20000, and a storage system 25000 are similar to those of the first embodiment shown in FIGS. 2 to 4.

FIG. 18 is a block diagram showing the configuration of the management computer 30000 according to the third embodiment of this invention.

Figure 20:
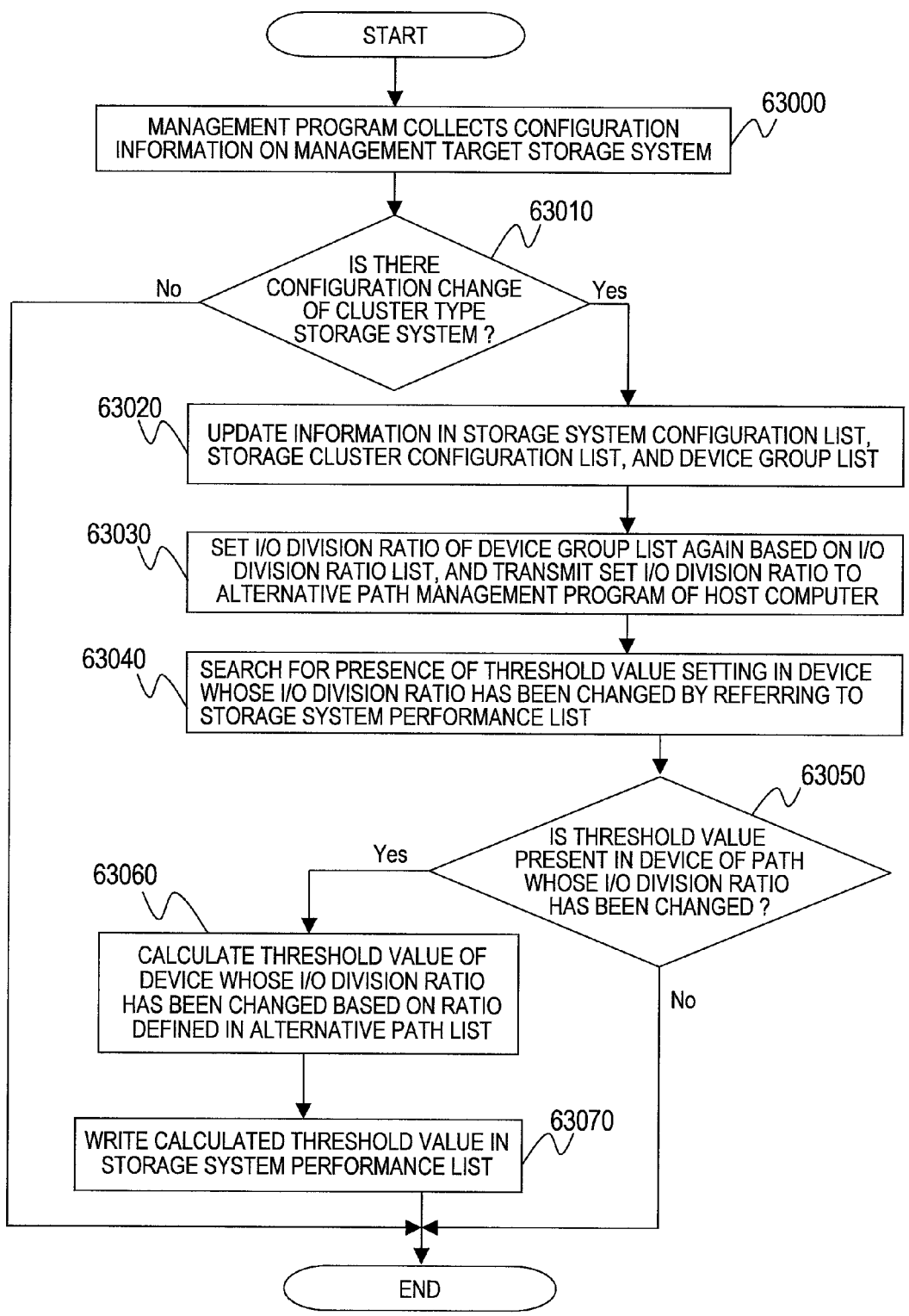
FIG. 20 is a flowchart of threshold value reviewing processing executed by a configuration management program according to the third embodiment of this invention.

The configuration of the management computer 30000 of the third embodiment is similar to that of the management computer 30000 of the first embodiment shown in FIG. 5 except for the fact that an I/O division ratio list 33700 shown in FIG. 19 is added to a memory 33000 and a configuration management program 33120 having threshold value reviewing processing shown in FIG. 20 added is provided.

FIG. 19 is an explanatory diagram of the I/O division ratio list 33700 held by the management computer 30000 of the third embodiment of this invention.

The I/O division ratio list 33700 includes three fields 33710 to 33730. The number of virtual storage systems 20000 disposed in the computer system to realize a storage cluster configuration is registered in the field 33710. An I/O division ratio to be set for a main path (master route) in the storage cluster configuration constituted of the number of virtual storage systems 20000 registered in the field 33710 is registered in the field 33720. An I/O division ratio to be set for a subpath (slave route) in the storage cluster configuration constituted of the number of virtual storage systems 20000 registered in the field 33710 is registered in the field 33730.

FIG. 19 shows an example of a specific value registered in the I/O division ratio list 33700 held by the management computer 30000. In this example, when the number of virtual storage systems constituting the storage cluster configuration is two, an I/O division ratio to be set for the main path (master route) is 90%, and an I/O division ratio to be set for the subpath (slave route) is 10%.

FIG. 20 is a flowchart of threshold value reviewing processing executed by a configuration management program 33120 according to the third embodiment of this invention.

The management computer 30000 periodically obtains configuration information from the storage system 25000, the virtual storage system 20000, and the host computer 10000 managed by the management computer 30000 (Step 63000). In this case, the configuration management program 33120 compares the obtained configuration information with contents of a storage system configuration list 33200 to determine whether the occurrence of the fault has caused a change in device configuration (Step 63010).

If it is determined in Step 63010 that there has been no configuration change, it is not necessary to review threshold values, so the configuration management program 33120 finishes the process.

On the other hand, if it is determined in Step 63010 that the configuration has been changed, the configuration management program 33120 updates contents of the storage system configuration list 33200, a storage cluster configuration list 33400, and a device group list 33500 to match the configuration information obtained in Step 63000 (Step 63020). In this case, the configuration management program 33120 determines which of the paths from the virtual device 16000 to the volume 29100 is a main path based on the configuration information. This determination is made by the same method as in Step 62020 of FIG. 16.

When the main path and the subpath are changed, the configuration management program 33120 sets an I/O division ratio 14460 of the alternative path list 33600 again based on the ratios registered in the I/O division ratio list 33700. Then, the configuration management program 33120 transmits the updated I/O division ratio to the alternative path management program 14300 of the host computer (Step 63030). The alternative path management program 14300 updates the alternative path list 14400 by registering the received I/O division ratio in the I/O division ratio 14460 of the alternative path list 14400.

As in the case of Step 62030 of FIG. 16, the I/O division ratio may be set by other methods.

Then, the configuration management program 33120 refers to a storage system performance list 33300 to investigate whether a threshold value has been set for the device of the path whose I/O division ratio has been changed (Step 63040).

The process branches based on a result of Step 63040 (Step 63050).

If no threshold value has been set in the device of the path of the changed I/O division ratio (Step 63050), the configuration management program 33120 finishes the process without setting any threshold value for the device.

On the other hand, if a threshold value has been set for the device of the path of the changed I/O division ratio (Step 63050), the configuration management program 33120 refers to the alternative path list 33500 to calculate a threshold value to be set for the device of the path of the changed I/O division ratio (Step 63060).

Then, the configuration management program 33120 registers the calculated threshold value in a threshold value of alert 33340 of the storage system performance list 33300 (Step 63070).

A specific example of a threshold value calculation method of Step 63060 will be described. In the configuration of FIG. 6, it is presumed that the I/O division ratios of the DEV111, the DEV121, and the DEV131 are respectively set to 70%, 20%, and 10%, and 100, 20, and 10 are set as threshold values of the VOL111, the VOL121, and the VOL131.

Subsequently, when the configuration of the computer system is changed as shown in FIG. 17, I/O division ratios of the DEV121 and the DEV131 are set again to 10% and 90%, respectively, based on the ratio registered in the I/O division ratio list 33700. In this case, according to the I/O division ratios, a threshold value of the VOL111 is set to 0, a threshold value of the VOL121 is set to 10, and a threshold value of the VOL131 is set to 100. In this case, the configuration management program 33120 subtracts 100 equivalent to a threshold value reduction of the VOL111 from the threshold value set in PORT1 through which I/O to the VOL111 passes among ports 21000 of the virtual storage system SYS1 including the VOL111. The configuration management program 33120 subtracts 10 equivalent to a threshold value reduction of the VOL121 to the threshold value set in PORT2 through which I/O to the VOL121 passes. Further, the configuration management program 33120 adds 90 equivalent to a threshold value increase of the VOL131 to the threshold value set in PORT3 through which I/O to the VOL131 passes.

The threshold value calculation method is in no way limitative of realizing means of this invention. The threshold values may be calculated by other methods.

The threshold value reviewing processing of this embodiment has been described.

The third embodiment has been described by way of example where a fault occurs in one of the virtual storage systems SYS1. However, even when the device configuration is changed for a reason other than the fault occurrence, this embodiment can be applied. For example, when the device configuration is changed to readjust a load balance, the third embodiment can be applied.

According to the third embodiment, even when the device configuration is changed as a result of a stop of I/O processing of a specific virtual storage system 20000 because of a system fault, a threshold value of each device can be calculated and set to match the changed device configuration.

In short, according to the first to third embodiments of this invention, the administrator using the management program can set a threshold value calculated based on the I/O division ratio set in the alternative path management program for the managed device. Thus, even when the I/O division ratios have been set for the devices of the virtual storage system of the host computer, it is possible to set proper threshold values for the devices according to the I/O division ratios.

When the main path and the subpath are substituted for each other as a result of readjustment of a balance of storage system processing efficiency and I/O loads among the plurality of virtual storage systems, I/O division ratios compliant with the changed device configuration can be set in the alternative path management program. Hence, it is possible to set proper threshold values for the devices according to the I/O division ratios.

Even when the device configuration is changed by a stop of I/O processing of one of the virtual storage systems because of a system fault, I/O division ratios compliant with the changed device configuration can be set in the alternative path management program. Hence, it is possible to set proper threshold values for the devices according to the I/O division ratios.

What is claimed is:

1. A computer system comprising:
   a host computer;
   virtual storage systems coupled to the host computer;
   a storage system coupled to the virtual storage systems; and
   a management computer coupled to the host computer, the virtual storage systems, and the storage system, wherein:
   the storage system includes a first interface coupled to the virtual storage systems via a first network, a second interface coupled to the management computer via a second network, a first processor coupled to the first interface and the second interface, and a first memory coupled to the first processor, and provides storage areas as volumes for data access by the host computer;
   each of the virtual storage systems includes a third interface coupled to the host computer and the storage system via the first network, a fourth interface coupled to the management computer via the second network, a second processor coupled to the third interface and the fourth interface, and a second memory coupled to the second processor, and provides virtual volumes corresponding to the volumes to the host computer;
   the host computer includes a fifth interface coupled to the virtual storage systems via the first network, a sixth interface coupled to the management computer via the second network, a third processor coupled to the fifth interface and the sixth interface, and a third memory coupled to the third processor, and disperses a plurality of data I/Os containing data to be written in one of the volumes to the virtual volumes via a plurality of paths reaching the one of the volumes according to a dynamically-set I/O division ratio of data I/Os for each of the plurality of paths to the total of data I/Os for all of the plurality of paths;
   the management computer includes a seventh interface coupled to the host computer, the virtual storage systems and the storage system via the second network, a fourth processor coupled to the seventh interface, and a fourth memory coupled to the fourth processor;

the management computer calculates, based on and in response to changing of the I/O division ratios, a new threshold value of a performance value to be dynamically set in the virtual volume of each of the paths to determine whether to generate an alert; and in response to an entry of a threshold value set by a user via an interface to the management computer for a first path among the plurality of paths in the virtual volume of the first path, the management computer calculates the new threshold value to be set in the virtual volume of a second path among the plurality of paths based on the entered threshold value and the dynamically-set I/O division ratio for the second path;

wherein the management computer dynamically sets the I/O division ratios based on correspondence between the volumes and the virtual volumes, and transmits the dynamically-set I/O division ratios to the host computer; and wherein when the number of virtual volumes through which a third path among the plurality of paths reaching one of the volumes passes is larger than the number of virtual volumes through which a fourth path among the plurality of paths passes, the management computer dynamically sets the I/O division ratios so that an I/O amount executed via the third path becomes smaller than an I/O amount executed via the fourth path.

2. The computer system according to claim 1, wherein when it is predicted based on the dynamically-set I/O division ratios that an I/O amount via the virtual volume of the second path among the plurality of paths reaching one of the volumes is larger than an I/O amount via the virtual volume of the first path among the plurality of paths, the management computer calculates the new threshold value so that the new threshold value set in the virtual volume of the second path becomes larger than the threshold value set in the virtual volume of the first path.

3. The computer system according to claim 1, wherein when the correspondence between the volumes and the virtual volumes is changed, the management computer dynamically sets the I/O division ratios based on the changed correspondence.

4. The computer system according to claim 3, wherein upon setting the I/O division ratios based on the changed correspondence, the management computer calculates the new threshold value based on the dynamically-set I/O division ratios.

5. A management computer, comprising:
an interface;
a processor coupled to the interface; and
a memory coupled to the processor;
wherein the management computer is arranged for coupling via the interface and a network to a host computer, a plurality of virtual storage systems coupled to the host computer, and a storage system coupled to the plurality of virtual storage systems, the storage system including storage areas provided as volumes for data access by the host computer; each of the virtual storage systems providing virtual volumes corresponding to the volumes to the host computer; and the host computer dispersing a plurality of I/Os containing data to be written in one of the volumes to the virtual volumes via a plurality of paths reaching the one of the volumes according to a dynamically-set I/O division ratio of data I/Os for each of the plurality of paths to the total of data I/Os for all of the plurality of paths;

the processor calculates, based on and in response to changing of the I/O division ratios, a new threshold value of a performance value to be dynamically set in the virtual volume of each of the paths to determine whether to generate an alert; and in response to an entry of a threshold value set by a user via the interface to the management computer for a first path among the plurality of paths in the virtual volume of the first path, the processor calculates the new threshold value to be set in the virtual volume of a second path among the plurality of paths based on the entered threshold value and the dynamically-set I/O division ratio for the second path;

wherein the processor dynamically sets the I/O division ratios based on correspondence between the volumes and the virtual volumes, and transmits the dynamically-set I/O division ratios to the host computer; and wherein when the number of virtual volumes through which a third path among the plurality of paths reaching one of the volumes passes is larger than the number of virtual volumes through which a fourth path among the plurality of paths passes, the processor dynamically sets the I/O division ratios so that an I/O amount executed via the third path becomes smaller than an I/O amount executed via the fourth path.

6. The management computer according to claim 5, wherein when it is predicted based on the dynamically-set I/O division ratio that an I/O amount via the virtual volume of the second path among the plurality of paths reaching one of the volumes is larger than the I/O amount via the virtual volume of the first path among the plurality of paths, the processor calculates the new threshold value so that the new threshold value set in the virtual volume of the second path becomes larger than the threshold value set in the virtual volume of the first path.

7. The management computer according to claim 5, wherein when the correspondence between the volumes and the virtual volumes is changed, the processor dynamically sets the I/O division ratios based on the changed correspondence.

8. The management computer according to claim 7, wherein upon setting the I/O division ratios based on the changed correspondence, the processor calculates the new threshold value based on the dynamically-set I/O division ratios.

9. A method of controlling a computer system including a host computer, a plurality of virtual storage systems coupled to the host computer, and a storage system coupled to the plurality of virtual storage systems, the storage system including a first interface coupled to the virtual storage system via a first network, a second interface coupled to a management computer via a second network, a first processor coupled to the first interface and the second interface, and a first memory coupled to the first processor, and providing storage areas as volumes for data access by the host computer; each of the virtual storage systems including a third interface coupled to the host computer and the storage system via the first network, a fourth interface coupled to the management computer via the second network, a second processor coupled to the third interface and the fourth interface, and a second memory coupled to the second processor, and providing virtual volumes corresponding to the volumes to the host computer; the host computer including a fifth interface coupled to the virtual storage systems via the first network, a sixth interface coupled to the management computer via the second network, a third processor coupled to the fifth interface and the sixth interface, and a third memory coupled to the third processor, and dispersing a plurality of data I/Os containing data to be written in one of the volumes to the virtual volumes via a plurality of paths reaching the one of the volumes according to a dynamically-set I/O division ratio of data I/Os for each of the plurality of paths to the total of data I/Os for all of the plurality of paths; and the management computer including a seventh interface coupled to the host computer, the virtual storage systems and the storage system via the second network, a fourth processor coupled to the seventh interface, and a fourth memory coupled to the fourth processor, the method comprising:

receiving an entry of a threshold value of a performance value to be dynamically set in the virtual volume of a first path among the plurality of paths to determine whether to generate an alert;

calculating a new threshold value to be dynamically set in the virtual volume of a second path among the plurality of paths based on and in response to changing of the entered threshold value and the dynamically-set I/O division ratios;

calculating, when it is predicted based on the dynamically-set I/O division ratios that an I/O amount via the virtual volume of the second path among the plurality of paths reaching one of the volumes is larger than an I/O amount via the virtual volume of the first path among the plurality of paths, the new threshold value set in the virtual volume of the second path to be larger than the threshold value set in the virtual volume of the first path;

determining, when the number of virtual volumes through which a third path among the plurality of paths reaching one of the volumes passes is larger than the number of virtual volumes through which a fourth path among the plurality of paths passes, the I/O division ratios so that an I/O amount executed via the third path becomes smaller than an I/O amount executed via the fourth path; and determining, when the correspondence between the volumes and the virtual volumes is changed, the I/O division ratios based on the changed correspondence.

10. The method of controlling a computer according to claim 9, further comprising determining the I/O division ratios based on correspondence between the volumes and the virtual volumes, and transmitting the determined I/O division ratios to the host computer.

11. The method of controlling a computer system according to claim 9, further comprising calculating, upon determining the I/O division ratios based on the changed correspondence, the new threshold value based on the determined I/O division ratios.

* * * * *